(12) United States Patent
Takahashi et al.

(10) Patent No.: US 6,216,450 B1
(45) Date of Patent: Apr. 17, 2001

(54) EXHAUST EMISSION CONTROL SYSTEM FOR INTERNAL COMBUSTION ENGINE

(75) Inventors: Hideaki Takahashi; Kimiyoshi Nishizawa, both of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/268,997

(22) Filed: Mar. 16, 1999

(30) Foreign Application Priority Data

Mar. 18, 1998 (JP) .................................................. 10-068756

(51) Int. Cl.[7] ....................................................... F01N 3/28
(52) U.S. Cl. ................................. 60/276; 60/274; 123/399
(58) Field of Search ............................ 60/272–278, 285, 60/286, 300; 123/399

(56) References Cited

U.S. PATENT DOCUMENTS

| 5,509,267 | * | 4/1996 | Theis ........................................ 60/274 |
| 5,533,332 | * | 7/1996 | Uchikawa ................................. 60/274 |
| 5,577,382 | * | 11/1996 | Kihara et al. ............................ 60/276 |
| 5,676,619 | | 10/1997 | Ohashi et al. ............................ 477/98 |
| 5,953,907 | * | 9/1999 | Kato et al. .............................. 60/274 |
| 5,979,404 | * | 11/1999 | Minowa et al. ....................... 123/399 |
| 5,992,144 | * | 11/1999 | Takanohashi et al. ................. 60/286 |
| 6,003,306 | * | 12/1999 | Kalversberg et al. ................. 60/274 |
| 6,058,701 | * | 5/2000 | Mashiki ................................. 60/285 |

FOREIGN PATENT DOCUMENTS 6-129246    5/1994   (JP) .

* cited by examiner

*Primary Examiner*—Tu Ba Hoang
(74) *Attorney, Agent, or Firm*—Foley & Lardner

(57) ABSTRACT

An exhaust emission control system for an internal combustion engine diagnoses a NOx storage capacity of a NOx storage type three-way catalyst disposed in an exhaust passage. A control unit of the exhaust emission control system includes a calculating section which calculates a quantity of fuel to a cylinder to bring an air fuel ratio of air-fuel mixture closed to a target ratio and to output an injection signal to a fuel injector based on the calculated quantity of fuel, an executing section which executes a rich-spike treatment for temporally enriching the air-fuel ratio of air-fuel mixture supplied to the engine in a lean condition, and a diagnosing section which diagnoses a NOx storage capacity of said NOx storage type three-way catalyst on the basis of a peak value of the air-fuel ratio during the rich-spike treatment.

16 Claims, 20 Drawing Sheets

EXHAUST EMISSION CONTROL SYSTEM FOR INTERNAL COMBUSTION ENGINE

BACKGROUND OF THE INVENTION

The present invention relates to improvements in an exhaust emission control system for an internal combustion engine, more particularly to an exhaust emission control system provided with a NOx storage type three-way catalyst.

A Japanese Patent Provisional Publication No. 6-129246 discloses an exhaust emission control apparatus which is arranged to store NOx when an engine is operated on an air-fuel mixture having a air-fuel ratio leaner than a stoichiometric ratio (lean operation) and to release the stored NOx when the air-fuel ratio of the mixture becomes richer than the stoichiometric ratio (rich operation). Further, the conventional apparatus is arranged to periodically execute a rich-spike treatment that temporally varies the air-fuel ratio of the mixture into a richer ratio as compared with the stoichiometric ratio to release the stored NOx and to purify the released NOx by means of HC and CO, which increases in volume during the rich operation and function as a reduction agent.

SUMMARY OF THE INVENTION

However, the NOx storage type three-way catalyst will lower its NOx storage capacity according to its aging. In case the NOx storage capacity is lowered, surplus NOx leaks out. In such a case, when the rich-spike treatment is executed in the traditional way, the supply amount of HC and CO to the NOx storage type three-way catalyst becomes excessive, so that the amount of HC and CO emitted increase. Therefore, it is necessary to diagnose the NOx storage capacity. Furthermore, it is preferable to diagnose an oxygen storage capacity of the NOx storage type three-way catalyst in addition to the NOx storage capacity in order to diagnose efficiency to convert all of HC, CO and NOx.

It is an object of the present invention to provide an improved exhaust emission control system which diagnoses NOx storage capacity and/or oxygen storage capacity of a NOx storage type three-way catalyst installed in the exhaust emission control system for an internal combustion engine.

An exhaust emission control system according to the present invention is for an internal combustion engine and comprises a NOx storage type three-way catalyst, an A/F sensor a fuel injector and a control unit. The NOx storage type three-way catalyst is disposed in an exhaust passage of the engine and functions to store NOx of exhaust gases when air air-fuel ratio of air-fuel mixture supplied to the engine is leaner than a stoichiometric ratio and to release and reduce NOx when the air-fuel ratio of the air-fuel mixture is richer than or equal to the stoichiometric ratio. The A/F sensor is disposed downstream of the NOx storage type three-way catalyst in the exhaust passage of the engine. The A/F sensor detects an air fuel ratio of the exhaust gases passed through the NOx storage type three-way catalyst. The fuel injector injects a quantity of fuel to a cylinder of the engine according to an injection signal. The control unit is arranged to calculate a quantity of fuel to said cylinder to bring an air-fuel ratio of the air-fuel mixture close to a target ratio and to output an injection signal to said fuel injector based on the calculated quantity of fuel, to execute a rich-spike treatment of temporally enriching the air-fuel ratio of the air-fuel mixture by adjusting the injection signal to the fuel injector, and to diagnose a NOx storage capacity of the NOx storage type three-way catalyst on the basis of the calculated air-fuel ratio during the rich-spike treatment.

DETAILED DESCRIPTION OF THE INVENTION

Referring to FIGS. 1 to 17, there is shown a first embodiment of an exhaust emission control system for an internal combustion engine E in accordance with present invention.

Figure 1:
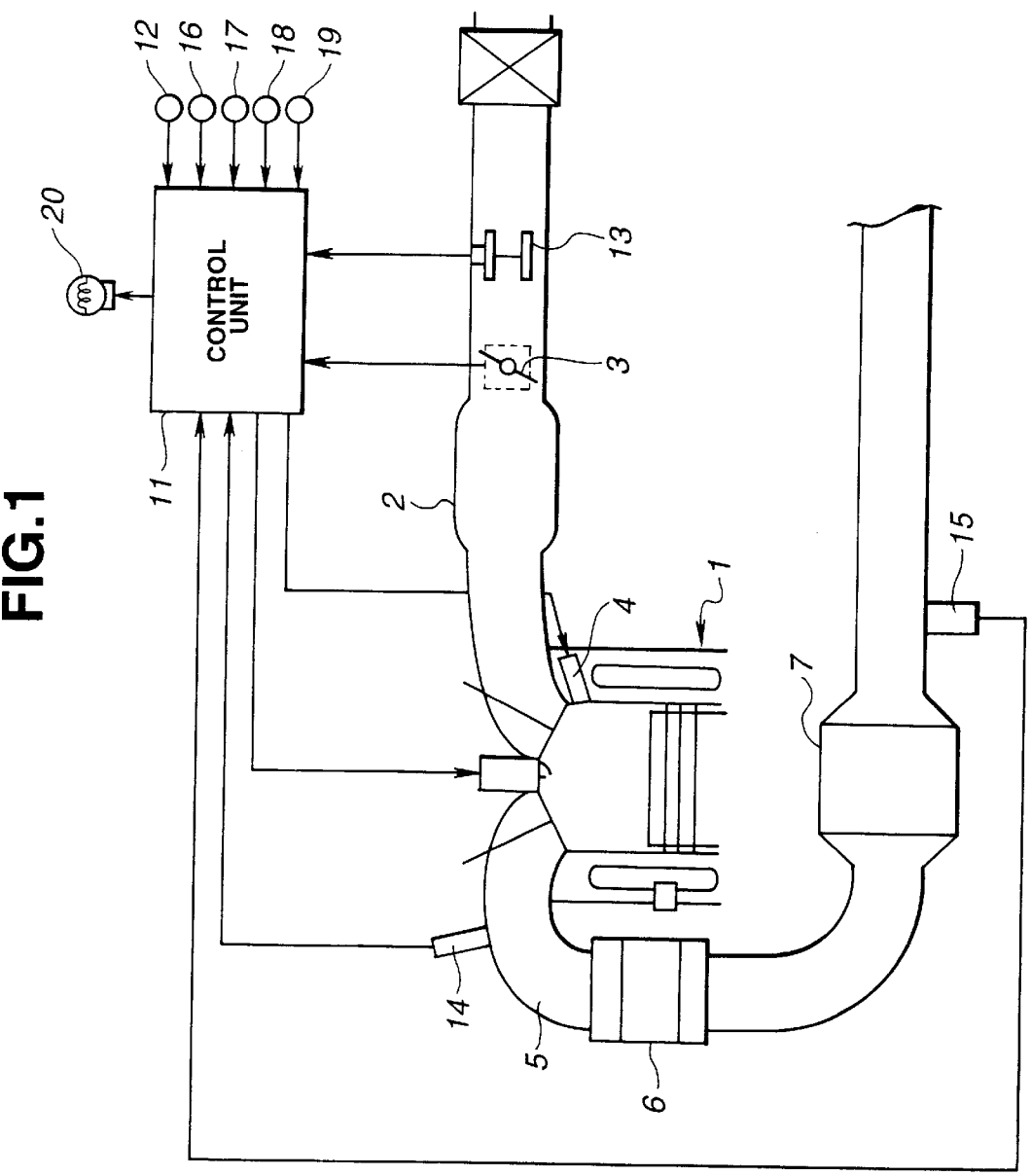
FIG. 1 is a schematic view showing a first embodiment of an exhaust emission control system according to the present invention.

As shown in FIG. 1, the internal combustion engine E is for an automotive vehicle and of an in-cylinder direct fuel injection type wherein fuel is injected directly into each cylinder. The engine E includes an engine main body 1 which is provided with an intake air passage 2 and an exhaust gas passage 5. A throttle valve 3 is disposed in the intake air passage 2 to control the quantity of intake air flowing through the intake air passage 2. A fuel injector 4 is disposed to project in each cylinder (not identified) of the engine main body 1 so as to directly inject fuel into the cylinder. The fuel injector 4 is arranged to inject fuel to form an air-fuel mixture having a certain air-fuel ratio in the cylinder, in accordance with an injection signal transmitted from a control unit 11 which forms a major part of the exhaust emission control system.

The exhaust emission control system comprises a crankangle sensor 12, an airflow meter 13, an oxygen ($O_2$) sensor 14, an A/F (air by fuel) sensor 15, an engine coolant temperature sensor 16, a gear position sensor 17, a vehicle speed sensor 18, and an accelerator operation amount sensor 19. The crankangle sensor 12 is adapted to generate a reference signal Ref at a rotation angle of a crankshaft (not shown) corresponding to a standard position of each piston, and a position signal Pos every a certain rotational angle of the crankshaft thereby to detect an engine speed NE of the engine E. The airflow meter 13 is disposed in the intake air passage 2 and adapted to generate an intake air quantity signal indicative of a quantity Qa of intake air to be supplied to the engine E. The oxygen sensor 14 and the A/F sensor 15 are disposed in the exhaust gas passage 5 shown in FIG. 1 and adapted to generate an air-fuel ratio (oxygen concentration) in the exhaust gas passage 5. The oxygen sensor 14 is disposed upstream of a three-way catalyst 6 that is discussed later. The A/F sensor 15 is disposed downstream of a NOx storage type three-way catalyst 7 that is discussed later. The engine coolant temperature sensor 16 is adapted to generate an engine coolant temperature signal indicative of a temperature TWIN of engine coolant (not shown) of the engine E. The gear position sensor 17 is adapted to generate a gear position signal indicative of the gear position of a transmission (not shown) of the engine E. The vehicle speed sensor 18 is adapted to generate a vehicle speed signal indicative of a vehicle speed VSP. The accelerator operation amount sensor 19 is adapted to generate an accelerator operation amount signal indicative of an operation amount APTV of an accelerator pedal (not shown).

Figure 2A:
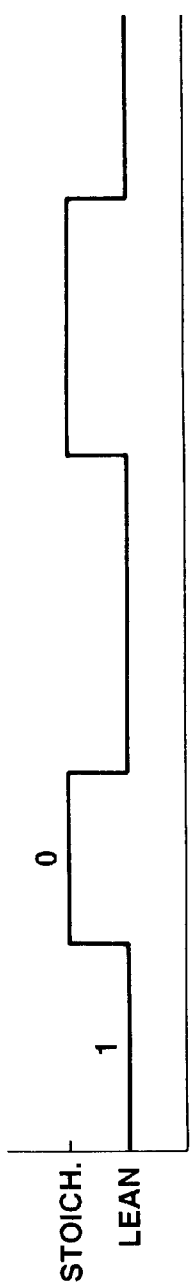
FIGS. 2A and 2B are graphs showing wave forms of a lean operation permitting flag under a changing vehicle speed, used in the control system of FIG. 1.
Figure 2B:
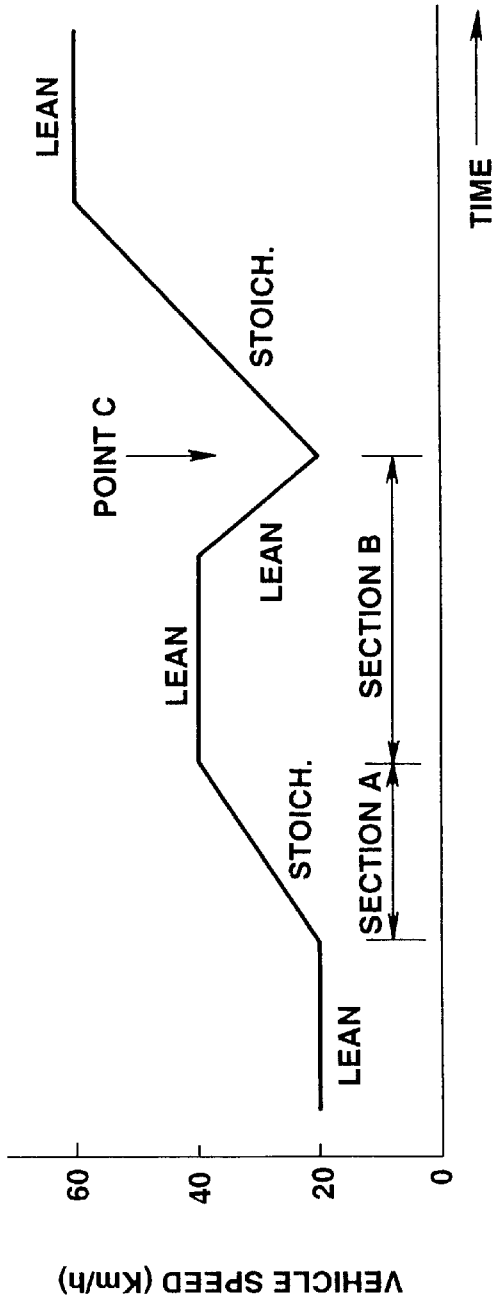

The control unit 11 is supplied with the above-mentioned signals from the various sensors and arranged to judge an operating condition of the vehicle in accordance with the signals. Under such judgment of the vehicle operating condition, the engine E is controlled to be operated on an air-fuel mixture having a lean air-fuel ratio (accomplishing a so-called lean operation) in a certain engine operation range where an engine load is not so high, and is operated on an air-fuel mixture having a generally stoichiometric air-fuel ratio (accomplishing so-called stoichiometric operation (stoich. op.)) in other engine operation ranges. For example, when the vehicle speed changes as shown in FIGS. 2A and 2B, a flag FLEAN (discussed after) for permitting a lean operation of the engine E changes as shown, in which the lean operation is carried out upon RLEAN=1 while the stoichiometric operation is carried out upon FLEAN=0.

A three-way catalyst 6 serving as a second catalyst is disposed in the exhaust gas passage 5, in which the catalyst 6 has an ability of absorbing oxygen and functions as the highest efficiency to reduce NOx (nitrogen oxides) and to oxidize HC (hydrocarbons) and CO (carbon monoxide) during the stoichiometric operation of the engine E. During the lean operation of the engine E, the three-way catalyst 6 oxides HC and CO but is low in reduction efficiency for NOx. In view of this, a NOx storage type three-way catalyst 7 serving as a first catalyst is disposed in the exhaust gas passage 5 downstream of three-way catalyst 6. The NOx storage type three-way catalyst 7 is arranged to function to store or absorb NOx generated in the engine E during the lean operation. It will be understood that exhaust gas having the air-fuel ratio leaner than the stoichiometric ratio is produced when the engine E is supplied with air-fuel mixture having the air-fuel ratio leaner than the stoichiometric ratio, while exhaust gas having the air-fuel ratio richer than the stoichiometric ratio is produced when the engine E is supplied with air-fuel mixture having the air-fuel ratio richer than the stoichiometric ratio.

When the lean operation of the engine E is continued for a long time, the NOx storage type three-way catalyst 7 reaches its limit of a NOx storage capacity of absorbing or storing NOx, and therefore it becomes impossible that the three-way catalyst 7 absorbs or stores NOx over the limit. In this regard, a rich-spike treatment (an enrichment treatment) for the air-fuel ratio of the air-fuel mixture is executed at predetermined intervals and further at a changeover timing from the lean operation to the stoichiometric operation. As mentioned above, the rich-spike treatment is executed by temporally varying the air-fuel ratio of the mixture into a richer ratio as compared with the stoichiometric ratio. In case of FIGS. 2A and 2B, in order to cause the NOx storage type three-way catalyst 7 to release and reduce NOx which has been absorbed or stored in the three-way catalyst 7 in a section B in FIG. 2B, the rich-spike treatment is executed at a point C immediately after the section B.

Figures 3A, 3B, 3C:
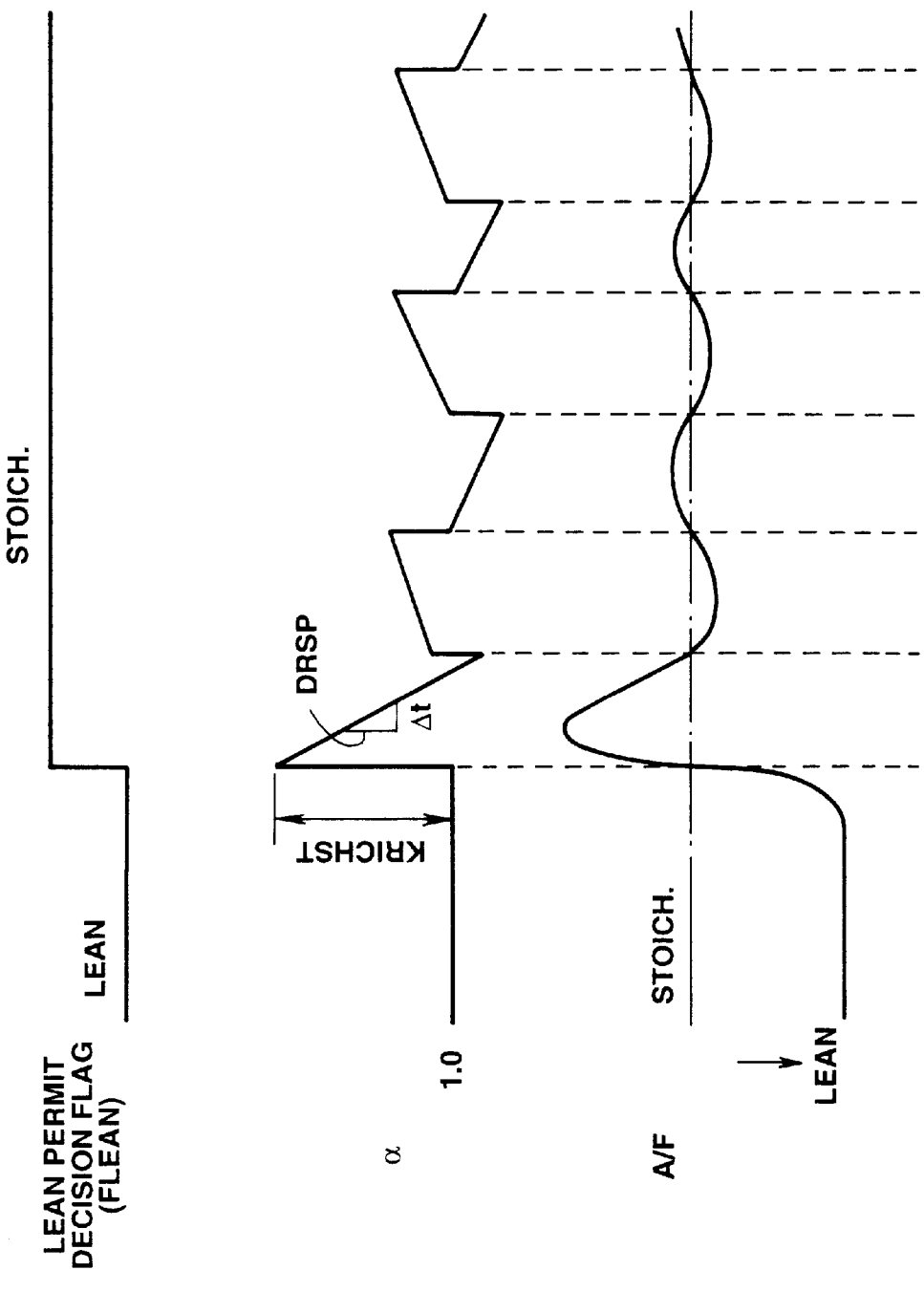
FIGS. 3A to 3C are graphs showing a rich-spike treatment for an air-fuel ratio, carried out in the control system of FIG. 1.

As shown in FIGS. 3A to 3C, in the rich-spike treatment executed at the changeover timing from the lean operation to the stoichiometric operation, an air-fuel ratio feedback correction coefficient α, which is calculated in accordance with an output of the oxygen sensor 14 during the stoichiometric operation and is clamped at 1.0 during other operations than the stoichiometric operation, is enlarged stepwise by an amount corresponding to an enrichment degree KRICHST, at the changeover timing from the lean operation to the stoichiometric operation. Then, α is decreased at a recovery rate DRSP. Thereafter, the rich-spike treatment at the changeover timing is terminated at a timing at which α reaches a slice level. Thus, the enrichment degree KRICHST during the stepwise changeover timing is enlarged by a correction amount determined upon taking account of the oxygen absorption ability of the three-way catalyst 6.

A manner of the above air-fuel ratio control executed by the control unit 11 will be discussed with reference to flowcharts of FIGS. 4, 5, 6, 8 and 15.

Figure 4:
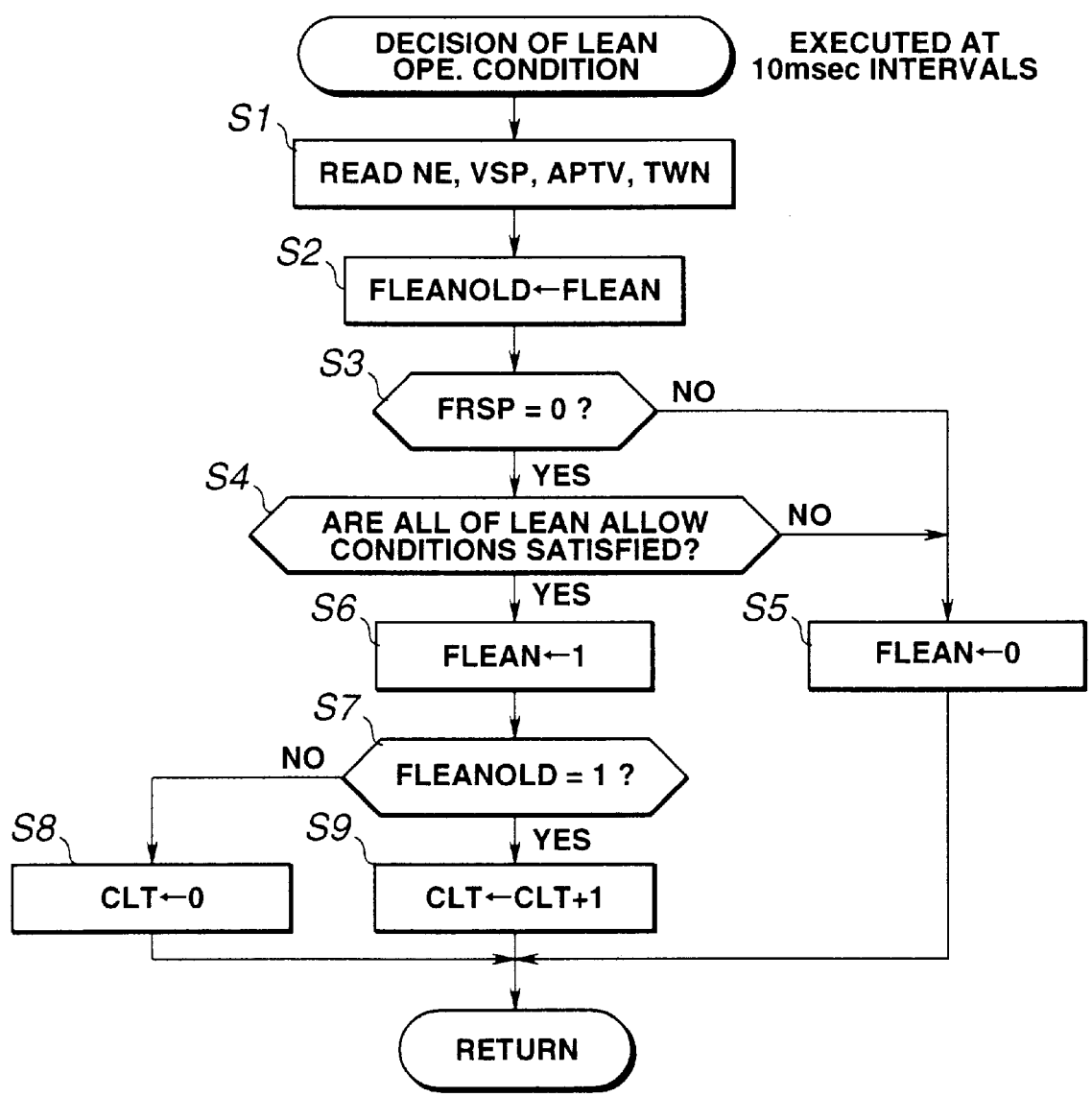
FIG. 4 is a flowchart for judging a condition of a lean operation of FIG. 1.

First, FIG. 4 shows a flowchart for accomplishing decision of the condition of the lean operation, in which the routine of the flowchart is executed every 10 msec.

At a step S1, the control unit 11 reads the engine speed NE, the vehicle speed VSP, the accelerator operation amount APTV, the engine coolant temperature TWIN and the like. In accordance with these signals, the control unit 11 successively executes the decision as to the respective ones of leans operation permitting conditions (discussed after).

At a step S2, the control unit 11 moves the value of the lean operation permitting flag FLEAN to a previous-time lean operation permitting flag (a flag for storing the value of the lean operation permitting flag at a prior time or at the immediately preceding computer computation cycle).

At a step S3, the control unit 11 checks whether a rich-spike treatment flag FRSP is set at 0 or not. When the decision at the step S3 is affirmative (FRSP=0), that is, when no rich-spike treatment is being made, the routine proceeds to a step S4. When the decision at the step S3 is negative, the routine proceeds to a step S5.

At step S4, the control unit 11 checks whether all flags indicative of the lean operation permitting conditions are set at 1 or not. That is, the control unit 11 checks whether all of the lean operation allowing conditions are satisfied or not. Here, the lean operation permitting conditions checked at the step S4 include a condition where warming-up of the engine E has been completed (in which a flag FLTWN=1); a condition where the engine speed is within a certain range for the lean operation (in which a flag FLRPM=1); a condition where the vehicle speed VSP is within a certain range (in which a flag FLVSP=1); a condition where the accelerator operation amount APTV is not larger than a certain value (in which a flag FLAPTRV=1). The flags checked at the step S4 are the above flags FLTWN, FLRPM, FLVSP, and FLAPTV. When the decision at the step S4 is negative, the routine proceeds to the step S5. When the decision at the step S4 is affirmative, the routine proceeds to a step S6.

At the step S5 following to the negative decision at the step S3 or S4, the control unit 11 sets the lean operation permitting flag FLEAN at 0 (FLEAN←0) as doing not permit the lean operation.

At the step S6 following to the both affirmative decision at the steps S3 and S4, the control unit 11 sets the lean operation permitting flag FLEAN at 1 (FLEAN←1) as permitting the lean operation.

At a step S7, the control unit 11 decides whether a changeover is made for permitting the lean operation at this time or current computer computation cycle) by checking whether the previous-time lean operation permitting flag FLEANOLD is set at 1 or not. When the decision at the step S7 is negative (FLEANOLD≠1), that is, when a changeover is made for permitting the lean operation at this time or current computer computation cycle, the routine proceeds to a step S8 in which a counter CLT for counting a continued time of the lean operation is reset (CLT←0). When the decision at the step S7 is affirmative (FLEANOLD=1) that is, when the lean operation is continued, the proceeds to a step S9 in which an increment is made on the counter CLT (CLT←CLT+1). After the execution at the step S8 or S9, the routine is returned.

Figure 5:
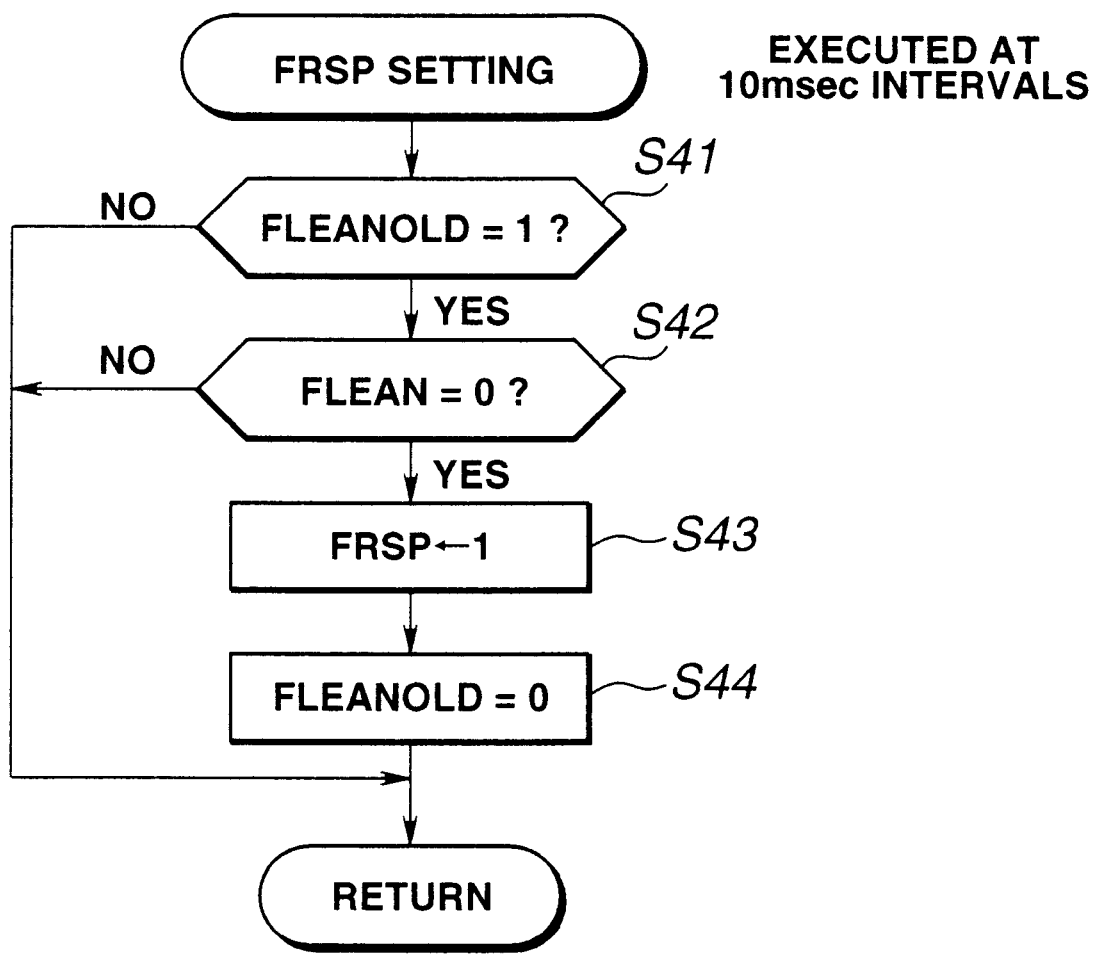
FIG. 5 is a flowchart for setting the rich-spike treatment flag FRSP of FIG. 1.

FIG. 5 shows a flowchart for setting a rich-spike treatment flag FRSP. The routine of the flowchart is executed every 10 msec.

At a step S41, the control unit 11 decides whether the previous-time lean operation permitting flag FLEANOLD is set at 1 or not. When the decision at the step S41 is affirmative (FLEANOLD=1), the routine proceeds to a step S42. When the decision at the step S41 is negative (FLEANOLD≠1), the routine jumps to a return step.

At the step S42, the control unit 11 decides whether the lean operation permitting flag FLEAN is set at 0 or not. When the decision at the step S42 is affirmative (FLEAN=0), that is, when it has been just the changeover timing from the lean operation to the stoichiometric operation, the routine proceeds to a step S43. When the decision at the step S42 is negative, the routine jumps to the return step.

At the step S43, the control unit 11 sets the rich-spike treatment flag FRSP at 1 (FRSP←1). The rich-spike treatment flag FRSP was initially set at 0 at the engine starting.

At a step S44, the control unit 11 sets the previous-time lean operation permitting flag FLEANOLD at 0 (FLEANOLD=0).

Figure 6:
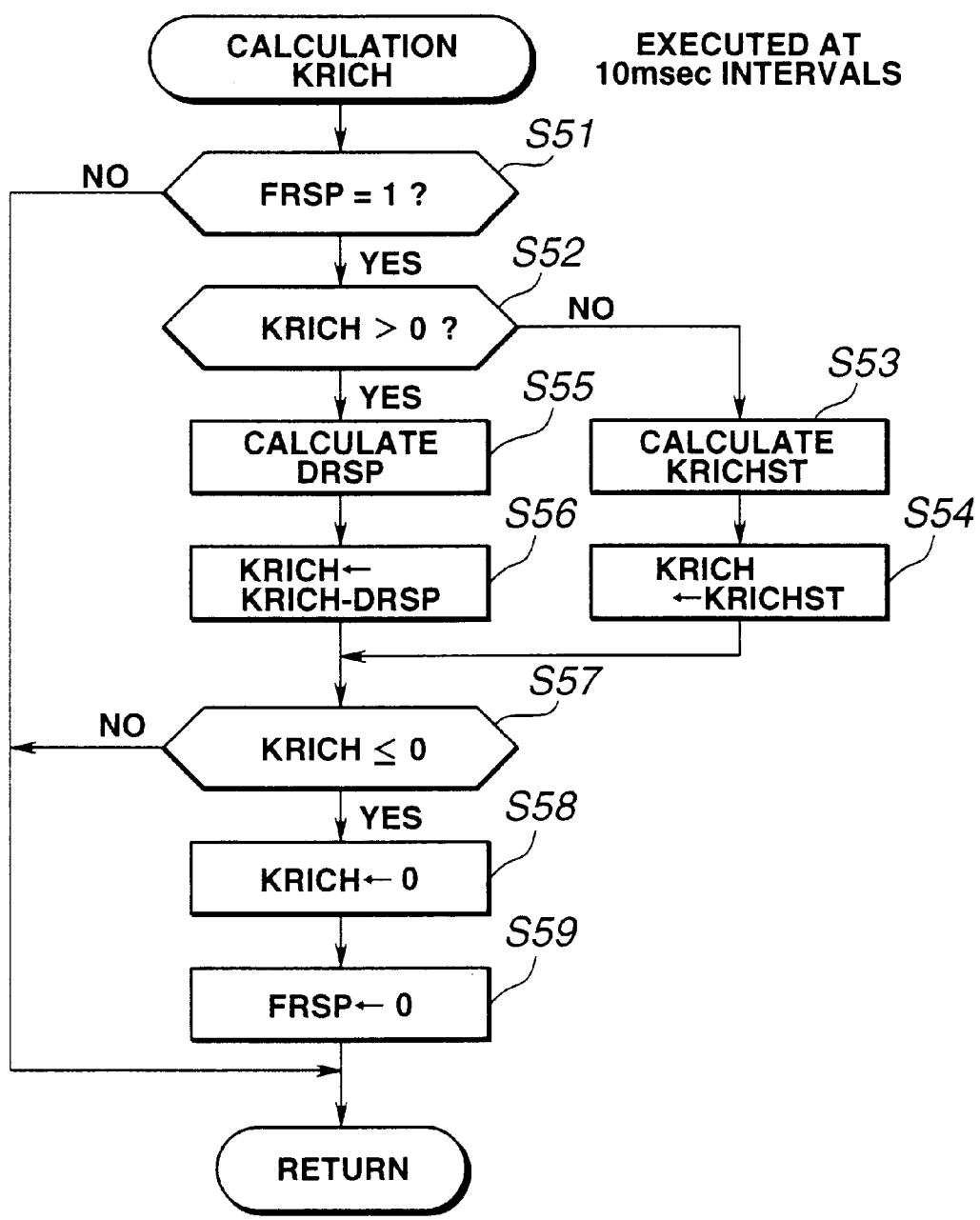
FIG. 6 is a flowchart for calculating an enrichment degree KRICH.

FIG. 6 is a flowchart for calculating the enrichment degree KRICH of the air-fuel ratio. The routine of the flowchart is executed following the routine of the flowchart of FIG. 5, every 10 msec.

At a step S51, the control unit 11 decides whether the rich-spike treatment flag FRSP is set at 1 or not. When FRSP=1, the routine proceeds to a step S52 in which the control unit 11 decides whether enrichment degree KRICH, which was initially set at 0 at the engine starting, is greater than 0 or not. When the decision at the step S52 is negative, that is, at a timing at which the rich-spike treatment flag FRSP=1 and when KRICH=0, the routine proceeds to steps S53 and S54 in which an initial value KRICHST of the enrichment degree (the enrichment degree at a step change) is calculated (as discussed after). This initial value KRICHST (KRICHST>1) is moved to KRICH (KRICH←KRICHST).

Figure 7:
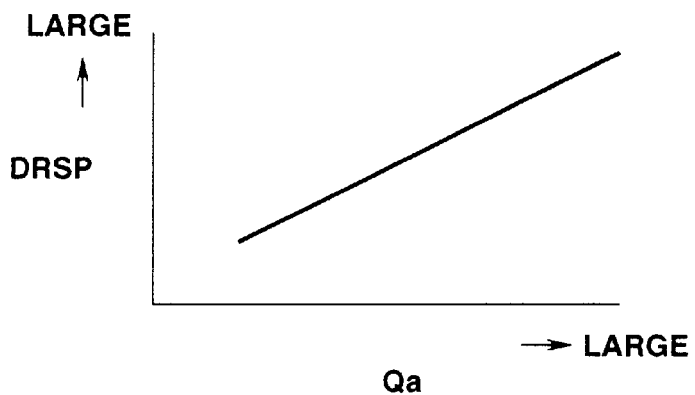
FIG. 7 is a graph showing a characteristic of a recovery rate DRSP.

When the decision at the step S52 is affirmative (KRICH>0), the routine proceeds to steps S55 and S56 in which searching is made on a table shown in FIG. 7 in accordance with the intake air quantity Qa, thereby obtaining a recovery rate DRSP (a recovery amount to the stoichiometric side per the operation time (10 msec)). A value obtained by subtracting this value DRSP from KRICH is newly set as KRICH. Here, the recovery rate DREP takes the characteristics shown in FIG. 7 because the supply amount of HC and CO increases as the intake air quantity Qa is larger.

At a step S57, the control unit 11 decides whether or not the enrichment degree KRICH is smaller than or equal to 0. When the decision at the step 57 is negative (KRICH>0), the steps S55 and S56 are repeated. Shortly, when the decision at the step S57 becomes affirmative (KRICH≦0), the routine proceeds to step S58 and S59 in which the setting of the rich-spike treatment flag FRSP=0 is made to complete the rich-spike treatment.

By employing the thus calculated enrichment degree KRICH, the air-fuel ratio feedback correction coefficient α is stepwise enlarged by the initial value KRICHST, and thereafter the coefficient α is minimized at the recovery rate DRSP. Then, at the timing at which the output of the oxygen sensor 14 is brought into coincidence with the slice level, the normal air-fuel ratio feedback control is initiated as shown in FIGS. 3A to 3C.

Figure 8:
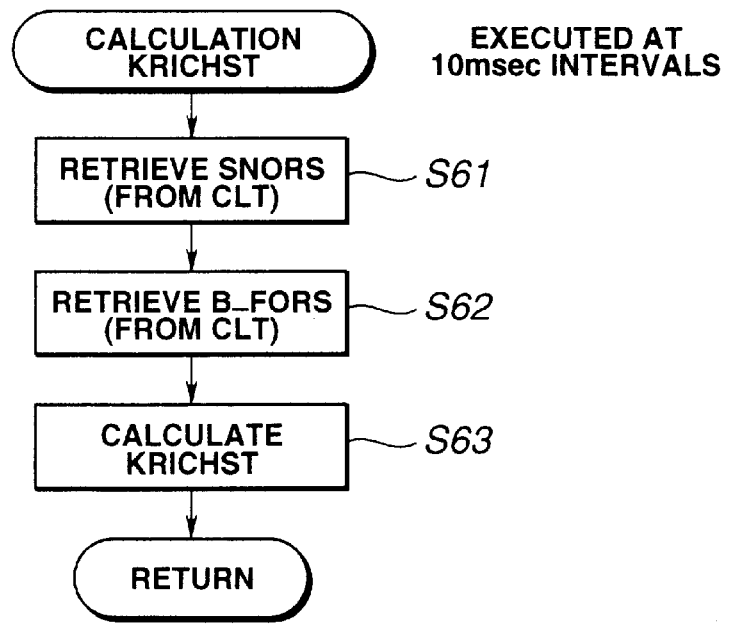
FIG. 8 is a flowchart for calculating an initial value KRICHST of the enrichment degree.

Here, calculation of the above-mentioned initial value KRICHST of the air-fuel ratio enrichment degree will be discussed with reference to a flowchart of FIG. 8. The flowchart of FIG. 8 is a subroutine of the step S53 of FIG. 6.

Figure 9:
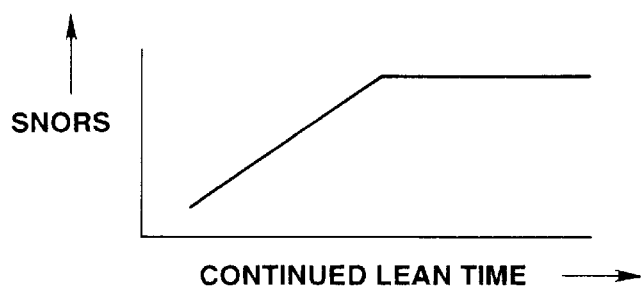
FIG. 9 is a graph showing a characteristic of the NOx releasing and reducing basic value SNORS.

At a step S61, the control unit 11 retrieves a NOx release-reduction basic value SNORS for the NOx storage type three-way catalyst 7 in connection with releasing and reducing NOx, on the basis of a table shown in FIG. 9 and the continued lean-operation time counted by the counter CLT.

Figure 10:
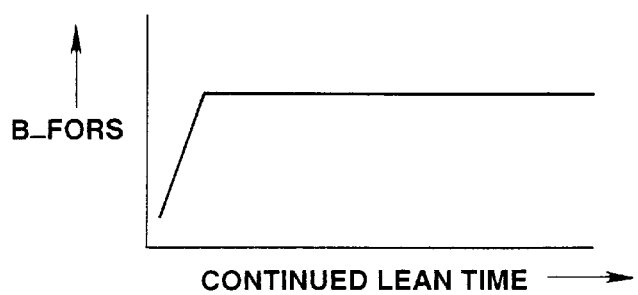
FIG. 10 is a graph showing a characteristic of an oxygen storage basic value B_FORS.

At a step S62, the control unit 11 retrieves an oxygen storage basic value B_FORS for the three-way catalyst 6 in connection with absorbing oxygen on the basis of a table of FIG. 10 and the continued lean-operation time counted by the counter CLT.

At a step S63, the control unit 11 calculates the enrichment degree initial value KRICHST by using the values SNORS and B_FORS obtained at the steps S61 and S62 and the following equation:

$$KRICHST = SNORSS + B\_FORS$$

Here, the NOx release-reduction basic value SNORS is a value required for generating HC and CO which causing NOx absorbed in the NOx storage type three-way catalyst 7 to be released and reduced. In concrete, the NOx release-reduction basic value SNORS increases with the increased continuation time of the lean operation as shown in FIG. 9 and becomes constant after NOx is fully stored in the Nox storage type three-way catalyst 7. The oxygen storage basic value B_FORS is a value corresponding to an amount of oxygen stored in the three-way catalyst 6 in its new condition, and has a characteristics shown in FIG. 10 which is similar to that in FIG. 9, so that it increases with the increased continuation time of the lean operation and becomes constant after oxygen is fully absorbed in the three-way catalyst 6. The characteristics in FIGS. 9 and 10 have an inclined linear portion which inclination depends on the capacity of the catalyst, so that the inclination of the inclined linear portion is smaller as the capacity of the catalyst is larger in case of using the same engine E.

However, it is impossible to boundlessly increase the enrichment degree initial value KRIOCHST, and there is an upper limit RSPMAX due to a rich side limit of stable combustion. Even if the initial value KRICHST is limited by the upper limit RSPMAX, it is necessary to ensure the supply amount of HC and CO supplied to the NOx storage three-way catalyst 7 as same as that in case that they are not limited by the upper limit RSPMAX.

Figure 11:
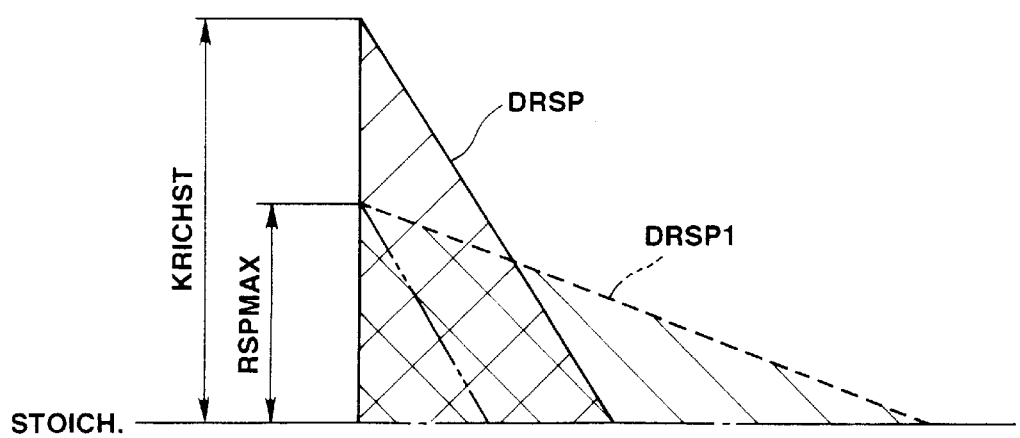
FIG. 11 is a graph illustrating a manner of calculation for a recovery rate in case that the initial value KRICHST of the enrichment degree is limited with an upper limit RSPMAX.

When the initial value is KRICHST and when the recovery rate is DRSP, the amount of HC and CO to be supplied to the NOx storage type three-way catalyst 7 generally corresponds to the area of a hatched high triangle having the recovery rate DRSP as shown in FIG. 11. Accordingly, even in case that the enrichment degree initial value is limited with the upper limit RSPMAX, the same amount of HC and CO can be supplied to the NOx storage type three-way catalyst 7 by lowering the recovery rate to DRSP1, as indicated as a hatched low triangle achieving the same area as that of the above-mentioned hatched high triangle in FIG. 11. The recovery rate DRSP1 in case that the enrichment degree initial value is limited with the upper limit RSPMAX can be calculated by the following equation:

$$DRSP1 = DRSP \times (RSPMAX/KRICHST)^2$$

There is a possibility that the NOx storage capacity of the NOx storage type three-way catalyst 7 and the oxygen storage capacity of the catalysts 6 and 7 change upon deterioration with age (or under different temperature conditions). Therefore, it is necessary to monitor these capacities of the catalysts 6 and 7.

The first embodiment according to the present invention is arranged to dispose the A/F sensor 15 in the exhaust passage 5 downstream of the NOx storage type three-way catalyst 7 so as to detect the air-fuel ratio (oxygen concentration) of the exhaust gases passed through the NOx storage type three-way catalyst 7. The diagnosis of the NOx storage capacity of the NOx storage type three-way catalyst 7 is executed on the basis of a peak value A/F1 of the A/F sensor 15 detected during the rich-spike treatment.

Figure 12:
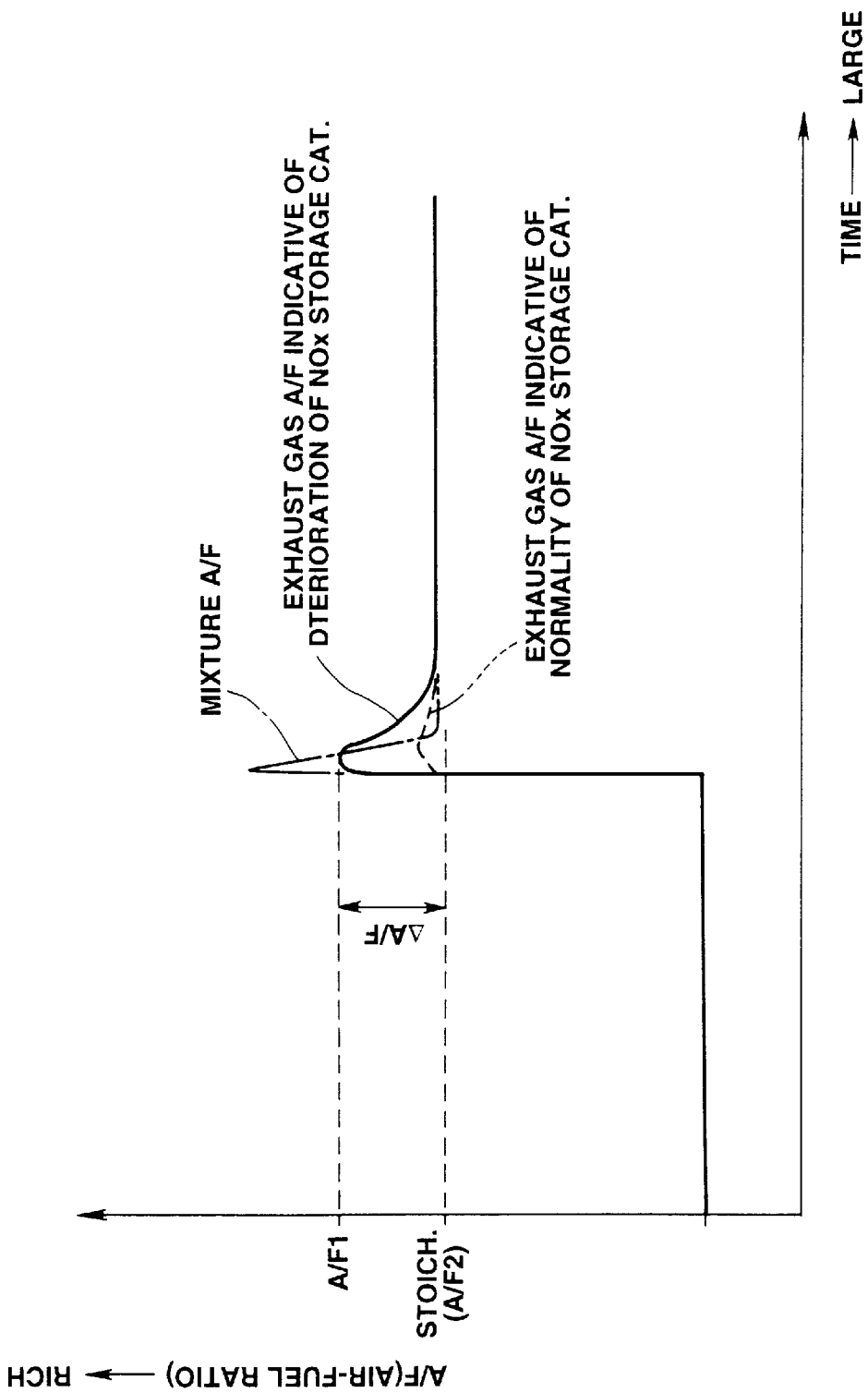
FIG. 12 is a graph showing a characteristic of an air-fuel ratio during a rich-spike treatment at a changeover timing.
Figure 13:
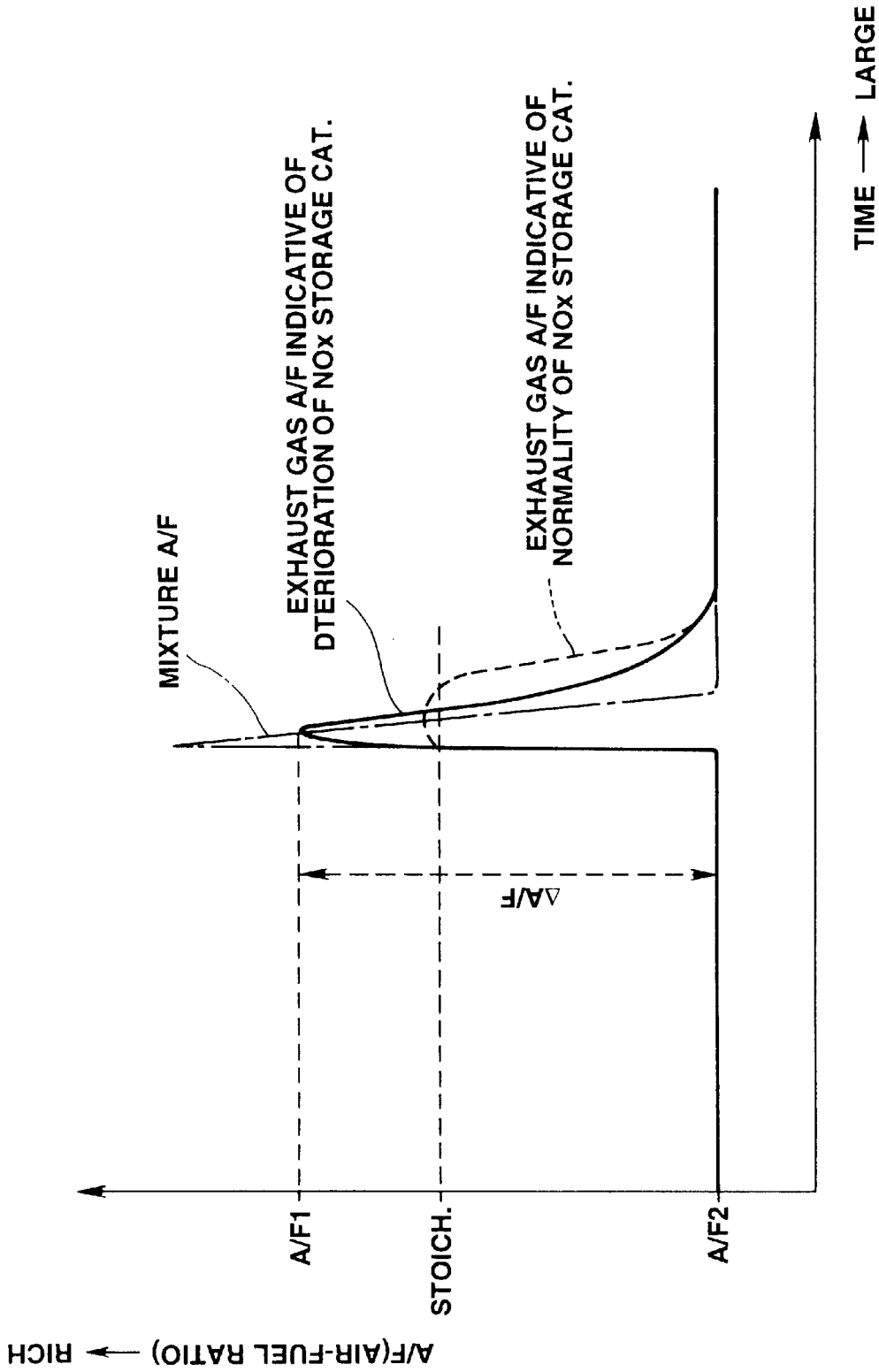
FIG. 13 is a graph showing another characteristic of the air-fuel ratio during the rich-spike treatment.

More specifically, as shown in FIGS. 12 and 13, in case that the NOx storage capacity of the NOx storage type three-way catalyst 7 is deteriorated, the peak value A/F1 of the air-fuel ratio detected by the A/F sensor 15 during the rich-spike treatment becomes large as compared with that of the normal one. The reason of this is considered that if the amount of NOx stored in the NOx storage type three-way catalyst 7 is decreased, the consumed amount HC and CO for releasing or reducing NOx through the NOx storage type three-way catalyst 7 is also decreased, and therefore the amount of HC and CO passing through the NOx storage type three-way catalyst 7 without executing reduction of the NOx is increased. Therefore, it is possible to calculate the NOx storage capacity of the NOx storage type three-way catalyst 7 on the basis of the peak value A/F1 detected during the rich-spike treatment.

However, the rich-spike treatment is executed not only during the changeover timing from the lean operation to the stoichiometric operation shown in FIG. 12, but also during the lean operation continued state shown in FIG. 13. Therefore, in order to adapt to this case, the present embodiment according to the present invention is arranged to obtain a peak difference ΔA/F which is a difference between the peak value A/F1 of the air-fuel ratio during the rich-spike treatment and the air-fuel ratio A/F2 stabled after the rich-spike treatment, to obtain a final threshold for judging the deterioration of the capacity of the catalyst 7 by adding a difference between A/F2 and the stoichiometric ratio (14.7) to a predetermined threshold 1. When the peak difference ΔA/F is greater than the threshold, the control unit 11 decides that the NOx storage capacity of the catalyst 7 is deteriorated. On the other hand, when the peak difference ΔA/F is smaller than the threshold, the control unit 11 decides that the NOx storage capacity of the catalyst 7 is normal, that is to say, it is not deteriorated.

That is, by comparing the peak difference ΔA/F (=A/F2−A/F1) with the threshold (=Threshold 1+A/F2−stoichiometric ratio), the control unit 11 accurately decides whether the NOx storage capacity is deteriorated without being affected by the stabled air-fuel ratio A/F2 stabled after the rich-spike treatment.

Figure 14:
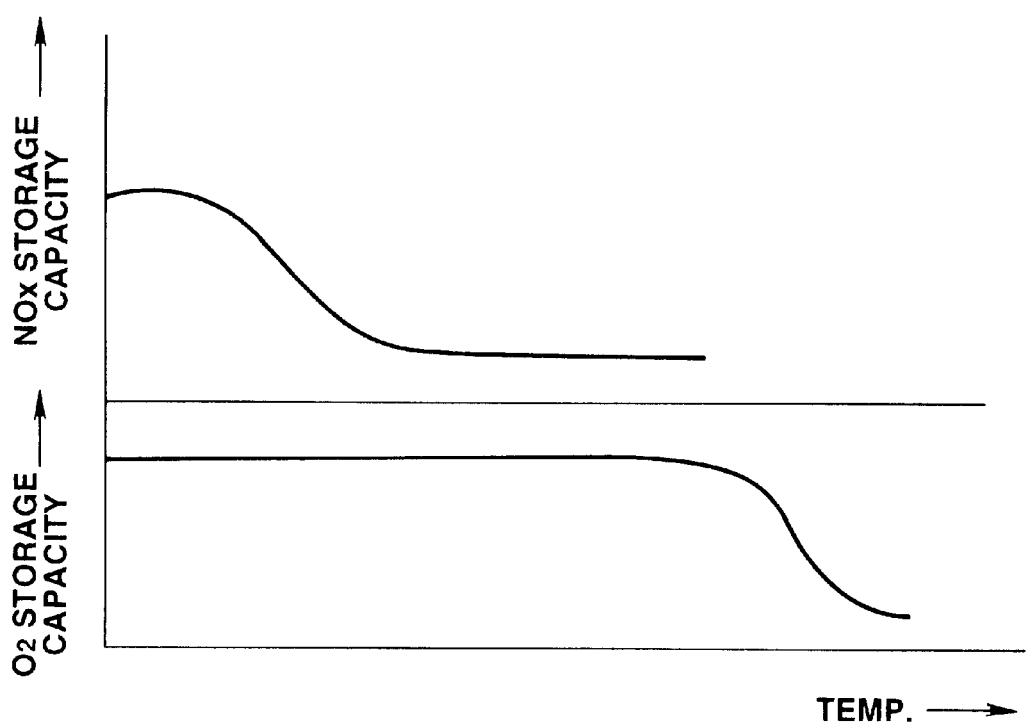
FIG. 14 is a graph showing characteristics of NOx storage capacity and oxygen storage capacity with respect to the temperature.

FIG. 14 shows a result of an experiment in which a thermal resistance abilities of the NOx storage type three-way catalyst 7 and the three-way catalyst 6 were measured. As is clear from the graph of FIG. 14, the NOx storage capacity is deteriorated according to the increase of the temperature preceding to the deterioration of the oxygen storage capacity. From the characteristics of the catalysts 6 and 7, it is considered that the NOx storage capacity of the NOx storage type three-way catalyst 7 is deteriorated by aging preceding to the aging deterioration of the oxygen storage capacity of the NOx storage type three-way catalyst 7 and the three-way catalyst 6. Accordingly, the decrease of the peak value A/F1 detected during the rich-spike treatment is never caused by the lowering of the oxygen storage capacity of the three-way catalyst 6 preceding to the lowering of the NOx storage capacity of the NOx storage type three-way catalyst 7. Further, when the peak difference ΔA/F is greater than the threshold, it is judged that the NOx storage capacity of the NOx storage type three-way catalyst 7 is lowered.

Figure 15:
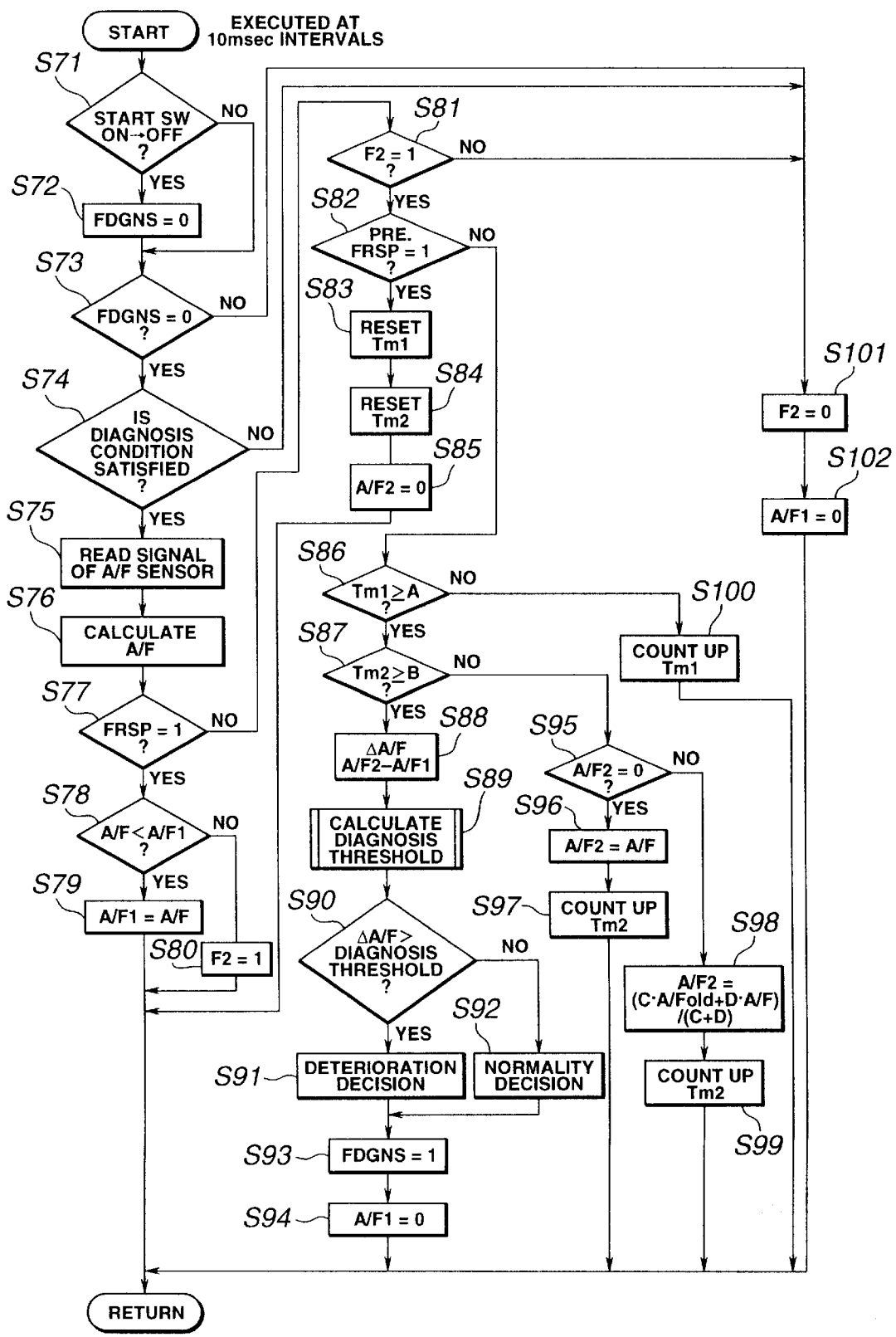
FIG. 15 is a flowchart for diagnosing the deterioration of a catalyst.

FIG. 15 shows a flowchart for diagnosing whether the NOx storage capacity of the NOx storage type three-way catalyst 7, upon detecting the peak difference ΔA/F caused by the rich-spike treatment. The routine of this flowchart is executed every 10 msec. The present embodiment is arranged to execute the diagnosis routine once immediately after the engine starting.

At a step S71, the control unit 11 decides whether the state of a start switch of the engine E is changed from ON state to OFF state. When the decision at the step S71 is affirmative, that is, when the engine E has just started, the routine proceeds to a step S72. When the decision at the step S71 is negative, the routine jumps to a step S73.

At the step S72, the control unit 11 resets a diagnosis termination flag FDGNS at 0 (FDGNS=0).

At the step S73, the control unit 11 checks whether the flag FDGNS is set at 0 or not, that is, whether or not the diagnosis of the NOx storage capacity of the catalyst 7 is not terminated. When the decision at the step S73 is affirmative, the routine proceeds to a step S74. When the decision at the step S73 is negative, the routine proceeds to a step S101.

At the step S74, the control unit 11 decides whether the diagnosis condition of the NOx storage type three-way catalyst 7 is satisfied or not. More specifically, the control unit 11 decides whether the temperature of the NOx storage type three-way catalyst 7 is greater than a predetermined value. When the decision at the step S74 is affirmative, the routine proceeds to a step S75. When the decision at the step S74 is negative, the routine jumps to the step S101.

At the step S75, the control unit 11 reads the output signal of the A/F sensor 15.

At a step S76 following to the step S75, the control unit 11 calculates the air-fuel ratio A/F of the exhaust gases passed through the NOx storage type three-way catalyst 7.

At a step S77, the control unit 11 decides whether a rich-spike execution flag FRSP is set at 1 or not. When the decision at the step S77 is affirmative (FRSP=1), the routine proceeds to a step S78. During the rich-spike treatment, the control unit 11 detects the peak value A/F1 of the air-fuel ratio by executing steps S77 to S80. When the decision at the step S77 is negative (FRSP≠1), the routine jumps to a step S81.

At the step S78, the control unit 11 decides whether or not the air-fuel ratio A/F at present is smaller than the peak value A/F1 set at the previous routine. When the decision at the step S78 is affirmative (A/F<A/F1), that is, when the present air-fuel ratio A/F is set in a rich side as compared with the prior peak value A/F1 set in the previous routine, the routine proceeds to a step S79. When the decision at the step S78 is negative (A/F≧A/F1), that is, when the present air-fuel ratio A/F is set in a lean side as compared with the prior peak value A/F1 set in the previous routine, the routine jumps to the step S80.

At the step S79 following to the affirmative decision at the step S78, the control unit 11 replaces the previous-time peak value A/F1 set in the previous routine with the present air-fuel ratio A/F (A/F1=A/F).

At the step S80, the control unit 11 sets a peak flag F2 indicative of the detection of a peak value set at 1 (F2=1).

After the execution of one of the steps S79 and S80, the routine proceeds to a return step.

When the decision at the step S77 is negative, it is decided that the rich-spike treatment is terminated. Therefore, the routine proceeds to the step S81 wherein the control unit 11 decides whether or not the peak value A/F1 is detected, by checking the flag F2. When the peak value A/F1 is detected (F2=1), the routine proceeds to a step S82. When the peak value A/F1 is not detected (F2≠1), the routine jumps to the step S101.

At the step S82, the control unit 11 decides whether the previous-time rich-spike execution flag FRSP is set at 1 or not. When the decision at the step S82 is affirmative (Pre. FRSP=1), that is, when the rich-spike treatment has just terminated, the routine proceeds to a step S83. When the decision at the step S82 is negative (Pre. FRSP≠1), that is, when it is not the moment immediately after the termination of the rich-spike treatment, the routine jumps to a step S86.

At the step S83, the control unit 11 resets a timer Tm1 (Tm1=0).

At a step S84 following to the execution of the step S84, the control unit 11 resets a timer Tm2 (Tm2=0).

At a step S85, the control unit 11 resets the air-fuel ratio A/F2 indicative of the air-fuel ratio detected after the termination of the rich-spike treatment (A/F2=0).

Following to the execution of the step S85, the routine returns to the start step.

When the decision at the step S82 is negative, that is, when it is not a moment that the rich-spike treatment has just terminated, the routine jumps to the step S86 wherein the control unit 11 decides whether the content of the timer Tm1 reaches a first predetermined time A or not. The timer Tm1 counts a waiting time for calculating a stabled air-fuel ratio A/F2. Therefore, when the content of the timer Tm1 does not reach the first predetermined time A (Tm1<A), that is, when the decision at the step S86 is negative, the routine jumps to a step S100 wherein the control unit counts up the counter Tm1 (Tm1←Tm1+1). When the content of the timer Tm1 reaches the first predetermined value A (Tm1≧A), that is, when the decision at the step S86 is affirmative, the routine proceeds to a step S87.

At the step S87, the control unit 11 decides whether the content of a timer Tm2 reaches a second predetermined time B or not. The timer Tm2 is prepared for calculating a weighted mean of the air-fuel ratio A/F2 after the rich-spike treatment. More specifically, the weighted mean of the air-fuel ratio A/F2 is calculated until the content of the timer Tm2 reaches the second predetermined time B.

When the decision at the step S87 is negative, that is, when the content of the timer Tm2 does not reach the second predetermined time (Tm2<B), the routine jumps to a step S95 to calculate the weighted mean of the air-fuel ratio A/F2 after the rich-spike treatment. When the decision at the step S87 is affirmative, the routine proceeds to a step S88.

At the step S95 for calculating the weighted mean of the air-fuel ratio A/F2 after the rich-spike treatment, the control unit 11 decides whether the air-fuel ratio A/F2 is 0 or not, to check whether this routine is first. When A/F2=0, representative of a first routine to the step S95, the routine proceeds to a step S96.

At the step S96, the control unit 11 treats the present air-fuel ratio A/F as the air-fuel ratio A/F2 after the rich-spike treatment (A/F2=A/F).

At a step S97, the control unit 11 counts up the timer Tm2 (Tm2←Tm2+1). Following to the step S97, the routine returns to the start step of this flowchart.

At the step S98 following to the negative decision at the step S95 (meaning the second or more routine to the step S95), the control unit 11 calculates the weighted mean A/F2 from the following equation (2):

$$A/F2 = (C \cdot A/Fold + D \cdot A/F)/(C+D) \qquad (2)$$

wherein C and D are weighted mean coefficients, A/Fold is the air-fuel ratio detected in the previous-time routine, A/F is the air-fuel ratio detected in the present routine.

Although this embodiment has been arranged to employ the weighted mean to calculate A/F2, it will be understood that the present invention is not limited to this calculation method and may employ other methods.

At a step S99 following to the execution of the step S98, the control unit 11 counts up the timer Tm2 (Tm2←Tm2+1). Following to the execution of the step S99, the routine returns to the start step.

On the other hand, at the step S88 following to the affirmative decision at the step S87, the control unit 11 calculates the peak difference $\Delta A/F$ of the A/F sensor 15 from the following equation (3):

$$\Delta A/F = A/F2 - A/F1 \quad (3)$$

Figure 16:
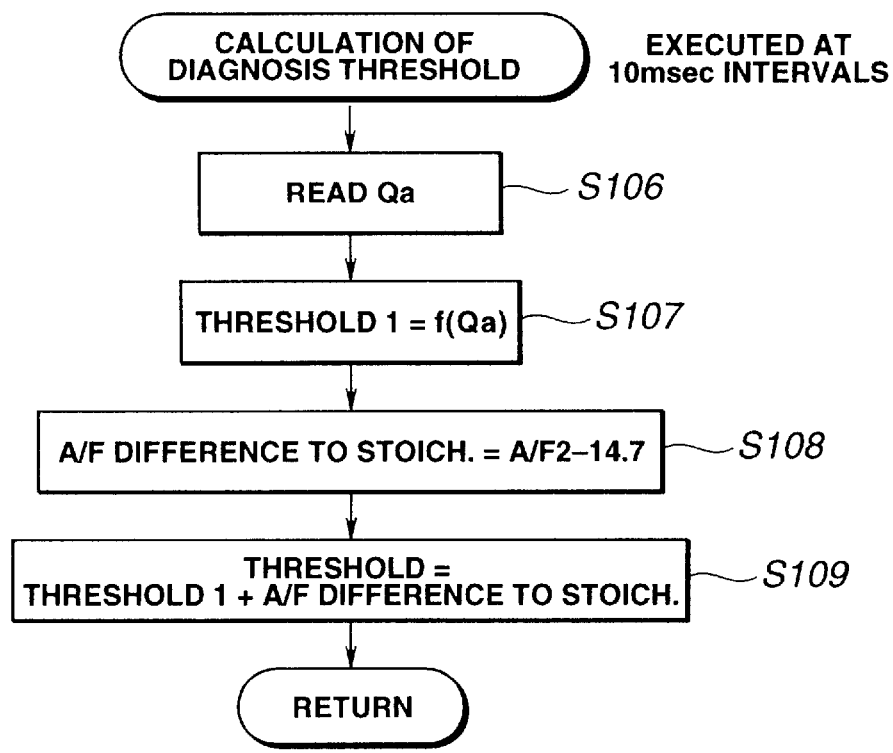
FIG. 16 is a flowchart for calculating a threshold used in the deterioration diagnosis.

At a step S89, the control unit 11 calculates the threshold used for diagnosing the NOx storage type three-way catalyst 7 by jumping to a subroutine shown by a flowchart of FIG. 16.

At a step S90, the control unit 11 decides whether or not the calculated peak difference $\Delta A/F$ is greater than or equal to the threshold. When the decision at the step S90 is affirmative, the routine proceeds to a step S91 wherein the control unit 11 decides that the NOx storage capacity of the NOx storage type three-way catalyst 7 is deteriorated and informs the deterioration of the catalyst 7 to a driver by turning on an alarm lamp 20. When the decision at the step S90 is negative, the routine proceeds to a step S92 wherein the control unit 11 decides that the NOx storage capacity of the NOx storage type three-way catalyst 7 is normal.

Following to the execution of the step S91 or S92, the routine proceeds to a step S93 wherein the control unit 11 sets the diagnosis termination flag FDGNS at 1 (FDGNS=1).

At a step S94 following to the step S93, the control unit 11 resets the peak value A/F1 at 0 (A/F1=0). Then, the routine returns to the start step.

After the execution of the diagnosis routine as mentioned above and the diagnosis termination flag FDGNS is set at 1, the negative decision is made at the step S73 and therefore the routine jumps to the step S101.

At the step S101, the control unit 11 resets the flag F2 (F2=0).

At the step S102 following to the step S102, the control unit 11 resets the peak value A/F1 (A/F1=0). After the execution of the step S102, the routine returns to the start step.

Next, the calculation of the threshold executed at the step S89 of the flowchart shown in FIG. 15 will be discussed with reference to a flowchart of FIG. 16.

At a step S106, the control unit 11 reads the signal outputted from the airflow meter 13 and calculates the intake air quantity Qa.

Figure 17:
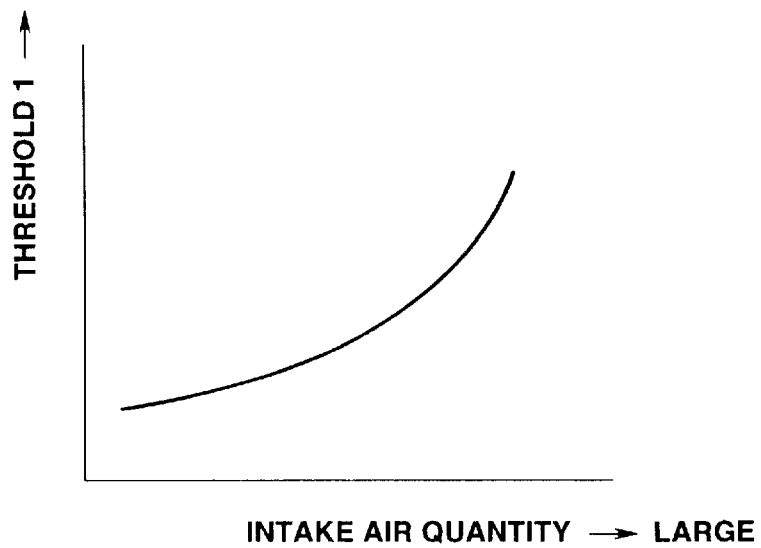
FIG. 17 is a graph showing a characteristic of a threshold 1.

At a step S107, the control unit 11 obtains the threshold 1 from the intake air quantity Qa and a table corresponding to a map indicative of a relationship between the intake air quantity Qa and the threshold 1 as shown in FIG. 17.

At a step S108, the control unit 11 calculates a A/F difference to stoich. by subtracting a stoichiometric ratio (14.7) from the weighted mean A/F2 (A/F difference to stoich.=A/F2−14.7).

At a step S109, the control unit 11 calculates the threshold by adding the threshold 1 and the A/F difference to stoich. (Threshold=Threshold1+A/F difference to stoich.). After the execution of the step S109, the subroutine returns to the step S89 of the main-routine of FIG. 15.

When the intake air quantity Qa increases, the amount of HC and CO supplied to the NOx storage type three-way catalyst 7 also increase. This increase of the amount of HC and CO also increases the amount of HC and CO passing through the NOx storage type three-way catalyst 7 without reducing NOx trapped in the NOx storage type three-way catalyst 7, and therefore the peak value A/F1 of the A/F sensor 15 increases. By largely correcting the threshold on the basis of the table shown in FIG. 17 according to the increase of the intake air quantity Qa, it is possible to accurately judge the NOx storage capacity of the NOx storage type three-way catalyst 7 on the basis of the peak value A/F1 detected by the A/F sensor 15 during the rich-spike treatment. Further, it will be understood that the correction of the peak value A/F1 may be executed by correcting the peak value A/F1 detected by the A/F sensor 15 during the rich-spike treatment according to the intake air quantity Qa. In this case, it is possible to accurately judge the NOx storage capacity of the NOx storage type three-way catalyst 7 even if the threshold is constant. Furthermore, it will be understood that the releasing and reducing of NOx may be executed according to the degree of the deterioration of the NOx storage type three-way catalyst 7, by calculating the NOx storage capacity of the NOx storage three-way catalyst 7 according to the peak value A/F1 detected by the A/F sensor 15 during the rich-spike treatment and the intake air quantity Qa, and by correcting the cycle period of the rich-spike treatment or an amount of the rich-spike treatment according to the NOx storage capacity.

Next, a second embodiment of the exhaust emission control system according to the present invention will be discussed with reference to FIGS. 18 to 25. The construction of the second embodiment is the same as that of the first embodiment shown in FIG. 1 except that the programs executed by the control unit 11 of the second embodiment are partially different from those of the first embodiment. The second embodiment is arranged to execute the rich-spike treatment twice continuously and to diagnose the oxygen storage capacity of the three-way catalyst 6 and the NOx storage type three-way catalyst 7 on the basis of the peak value A/F1 detected during the second rich-spike treatment.

When the control unit 11 decides that the NOx storage capacity is not deteriorated during the first rich-spike treatment, the control unit 11 also decides that the oxygen storage capacity is not deteriorated. When the peak value A/F1 detected during the second rich-spike treatment is greater than the threshold, the control unit 11 decides that the oxygen storage capacity of each of the three-way catalyst 6 and the NOx storage type three-way catalyst 7 is deteriorated. As is clear from the characteristics shown in FIG. 14, the oxygen storage capacity is never deteriorated prior to the deterioration of the NOx storage capacity. Therefore, when the peak value A/F1 detected during the first rich-spike treatment is smaller than the threshold, the control unit 11 decides that both of the NOx storage capacity and the oxygen storage capacity are normal (are not deteriorated).

Figure 24:
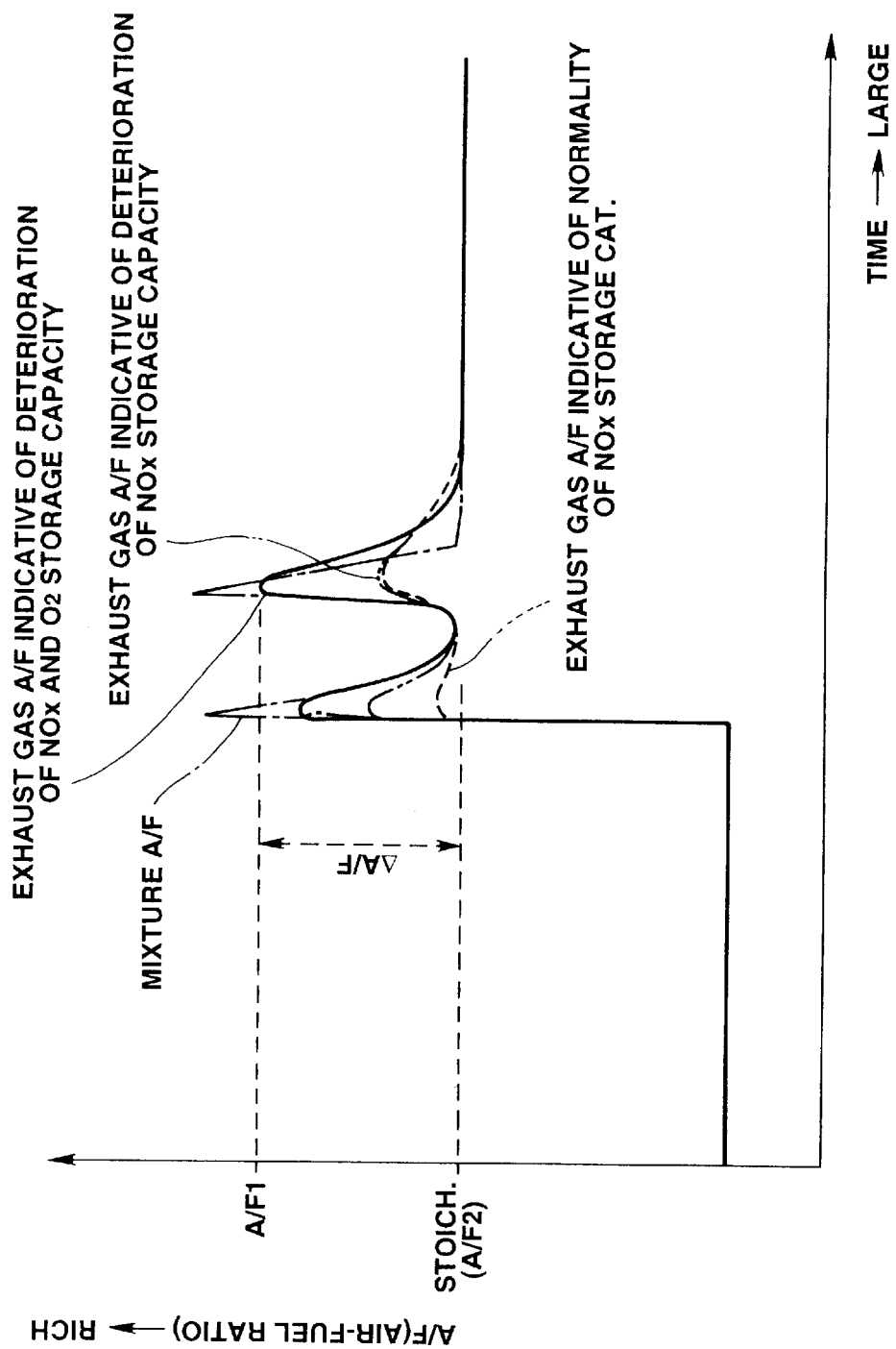
FIG. 24 is a graph showing a characteristic of the air-fuel ratio during the rich-spike treatment at a changeover timing.
Figure 25:
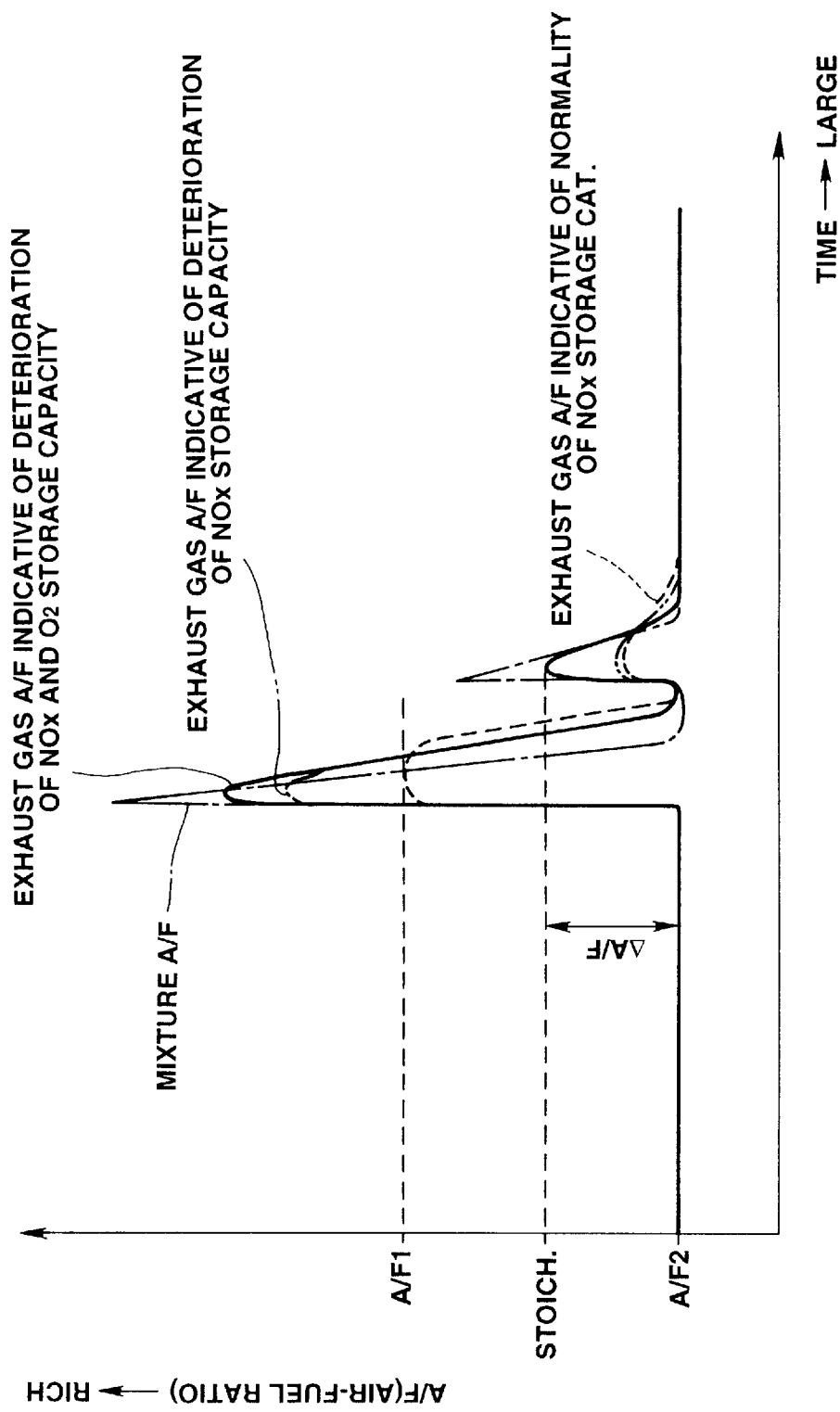
FIG. 25 is a graph showing another characteristic of the air-fuel ratio during the rich-spike treatment.

On the other hand, since almost all of NOx stored by the NOx storage type three-way catalyst 7 is released and reduced during the first rich-spike treatment, HC and CO supplied during the second rich-spike treatment is mainly consumed for releasing and reducing oxygen stored in the three-way catalyst 6 and the NOx storage type three-way catalyst 7. Therefore, as shown in FIGS. 24 and 25, the peak value A/F1 detected during the second rich-spike treatment performs a characteristic that the detected peak value A/F1 of a deteriorated one is greater than that of a normal one. Therefore, when the peak value A/F1 detected during the second rich-spike treatment is greater than the threshold, the control unit 11 decides that the oxygen storage capacity of the three-way catalyst 6 and the NOx storage type three-way catalyst 7 is deteriorated.

Figure 18:
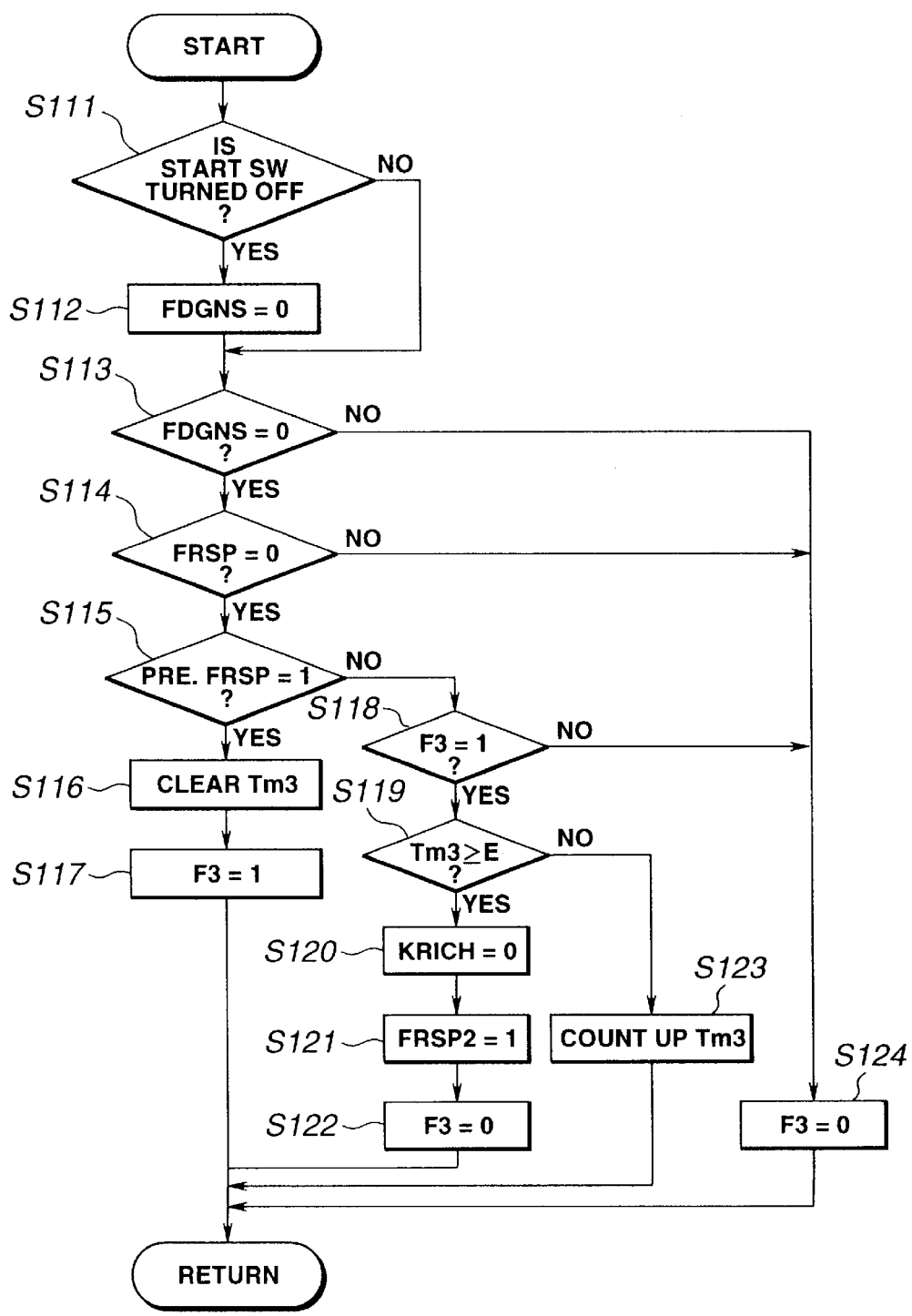
FIG. 18 is a flowchart for calculating a timing of a second rich-spike treatment in another embodiment of the exhaust emission control system according to the present invention.

FIG. 18 shows a flowchart for setting a second rich-spike execution flag FRSP2 in order to execute the second rich-spike treatment after a predetermined time E elapses from the termination of the first rich-spike treatment. This routine of FIG. 18 is executed every 10 msec following to the routine of the flowchart of FIG. 15.

At a step S111, the control unit 11 decides whether the state of the starter switch is changed from ON state to OFF state, in order to execute this diagnosis once after the engine starting. When the decision at the step S111 is affirmative, that is, when the engine E has just been started, the routine proceeds to a step S112. When the decision at the step S111 is negative, the routine jumps to a step S113.

At the step S112, the control unit 11 resets the first diagnosis termination flag FDGNS (FDGNS=0). When the first diagnosis termination flag FDGNS is set at 0, the first diagnosis is not executed.

At the step S113, the control unit 11 decides whether the diagnosis termination flag FDGNS is set at 0 or not. When the decision at the step S113 is negative (FDGNS=1), the routine jumps to a step S124. When the decision at the step S113 is affirmative (FDGNS=0), the routine proceeds to a step S114.

At the step S114, the control unit 11 decides whether the rich-spike execution flag FRSP is reset or not. When the decision at the step S114 is negative (FRSP=1), the routine jumps to the step S124. When the decision at the step S114 is affirmative (FRSP=0), the routine proceeds to a step S115 to set the second rich-spike execution flag FRSP2 after the predetermined time E elapses from the termination of the first rich-spike treatment.

That is, at the step S115, the control unit 11 decides whether the previous-time rich-spike execution flag FRSP is set at 1 or not. When the decision at the step S115 is negative (FRSP=0), the routine jumps to a step S118. When the decision at the step S115 is affirmative (FRSP=1), the routine proceeds to a step S115.

At the moment immediately after the previous-time rich-spike treatment was executed, the previous FRSP is set at 1 (FRSP=1). Therefore, at this time, the routine proceeds to the step S116. At the step S116, the control unit 11 resets a timer Tm3 (Tm3=0).

At a step S117 following to the step S116, the control unit 11 sets a flag F3 at 1 (F3=1). In the next routine of FIG. 18, the previous FRSP is not 1 (FRSP≠1). Therefore, when the flowchart of FIG. 18 is executed next, the routine proceeds from the step S115 to the step S118.

At the step S118, the control unit 11 decides whether the flag F3 is set at 1 or not. When the decision at the step S118 is negative (F3≠1), the routine jumps to the step S124. When the decision at the step S118 is affirmative (F3=1), the routine proceeds to a step S119.

At the step S119, the control unit 11 decides whether the timer Tm3 is greater than or equal to E or not. That is, the control unit 11 awaits that the timer Tm3 reaches E. When the decision at the step S119 is negative (Tm3<E), the routine jumps to a step S123 wherein the counter Tm3 is counted up. The steps S119 and S123 are repeated until the timer Tm3 is counted up from a moment immediately after the execution of the first rich-spike treatment to the predetermined time E.

At a step S120 following to the affirmative decision at the step S119, the control unit 11 resets the enrichment degree KRICH of the air-fuel ratio (KRICH=0).

At a step S121 following to the step S120, the control unit 11 sets the second rich-spike execution flag FRSP2 at 1 (FRSP2=1).

At a step S122 following to the step S121, the control unit 11 resets the flag F3 (F3=0). Then, the routine returns to the start step.

In case of the negative decision of the step S113, S114 or S118, the routine jumps to the step S124 wherein the flag F3 is reset (F3=0).

Figure 19:
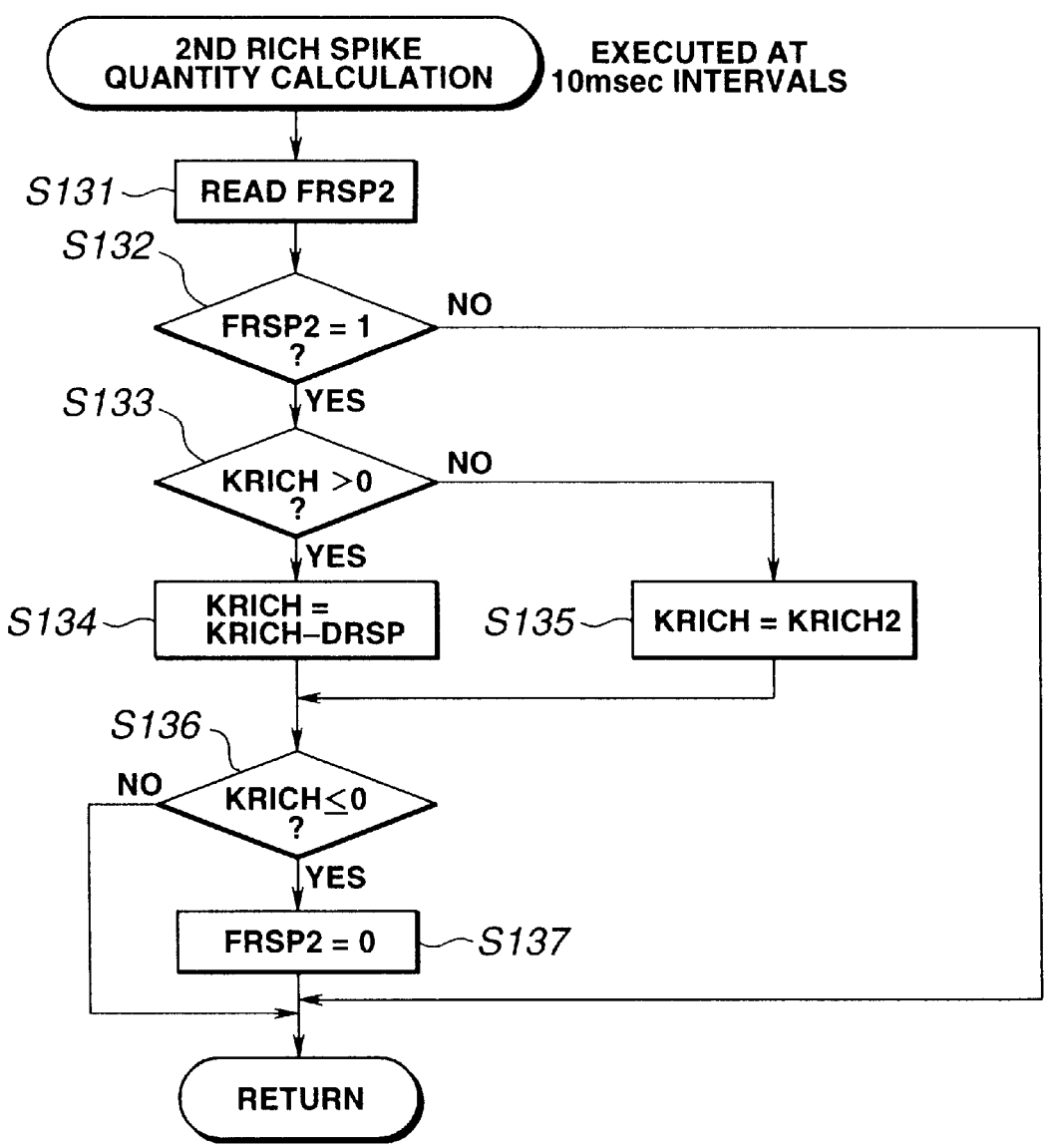
FIG. 19 is a flowchart for calculating a rich-spike amount in the second rich-spike treatment.

FIG. 19 shows a flowchart for calculating the enrichment degree KRICH of the air-fuel ratio during the second rich-spike treatment. This routine of FIG. 19 is executed every 10 msec.

At a step S131, the control unit 11 reads the second rich-spike execution flag FRSP2.

At a step S132, the control unit 11 decides whether the second rich-spike execution flag FRSP2 is set at 1 or not, in order to check whether the second rich-spike treatment was executed. When the decision at the step S132 is affirmative (FRSP2=1), the routine proceeds to a step S133. When the decision at the step S132 is negative (FRSP2≠1), the routine jumps to a return step.

At the step S133, the control unit 11 decides whether the enrichment degree KRICH is greater than 0. The enrichment degree KRICH has been set at 0 at the engine starting as an initial setting. When the decision at the step S133 is affirmative (KRICH>0), the routine proceeds to a step S134. When the decision at the step S133 is negative (KRICH≦0), that is, when it is the second timing of the rich-spike treatment, the routine proceeds to a step S135.

At the step S134, the control unit 11 sets the enrichment degree KRICH at a value obtained by subtracting a predetermined recovery rate DRSP from KRICH (KRICH=KRICH−DRSP).

At the step S135, the control unit 11 sets the enrichment degree KRICH at an initial value (an enrichment degree during the stepwise change) KRICH2.

At a step S136 following to the execution of the step S134 or S135, the control unit 11 decides whether or not the enrichment degree KRICH is smaller than or equal to 0 (KRICH≦0). When the decision at the step S136 is negative, the execution of the steps S133 and S134 are repeated. When the decision at the step S136 is affirmative, the routine proceeds to a step S137.

At the step S137, the control unit 11 sets the second rich-spike execution flag FRSP2 at 0 (FRSP2=0) to terminate the rich-spike treatment.

By using the thus calculated enrichment degree KRICH, the air-fuel feedback correction coefficient α is increased stepwise by the initial value KRICH2. Thereafter, the air-fuel ratio feedback correction coefficient α is decreased at the recovery rate DRSP.

Figure 20:
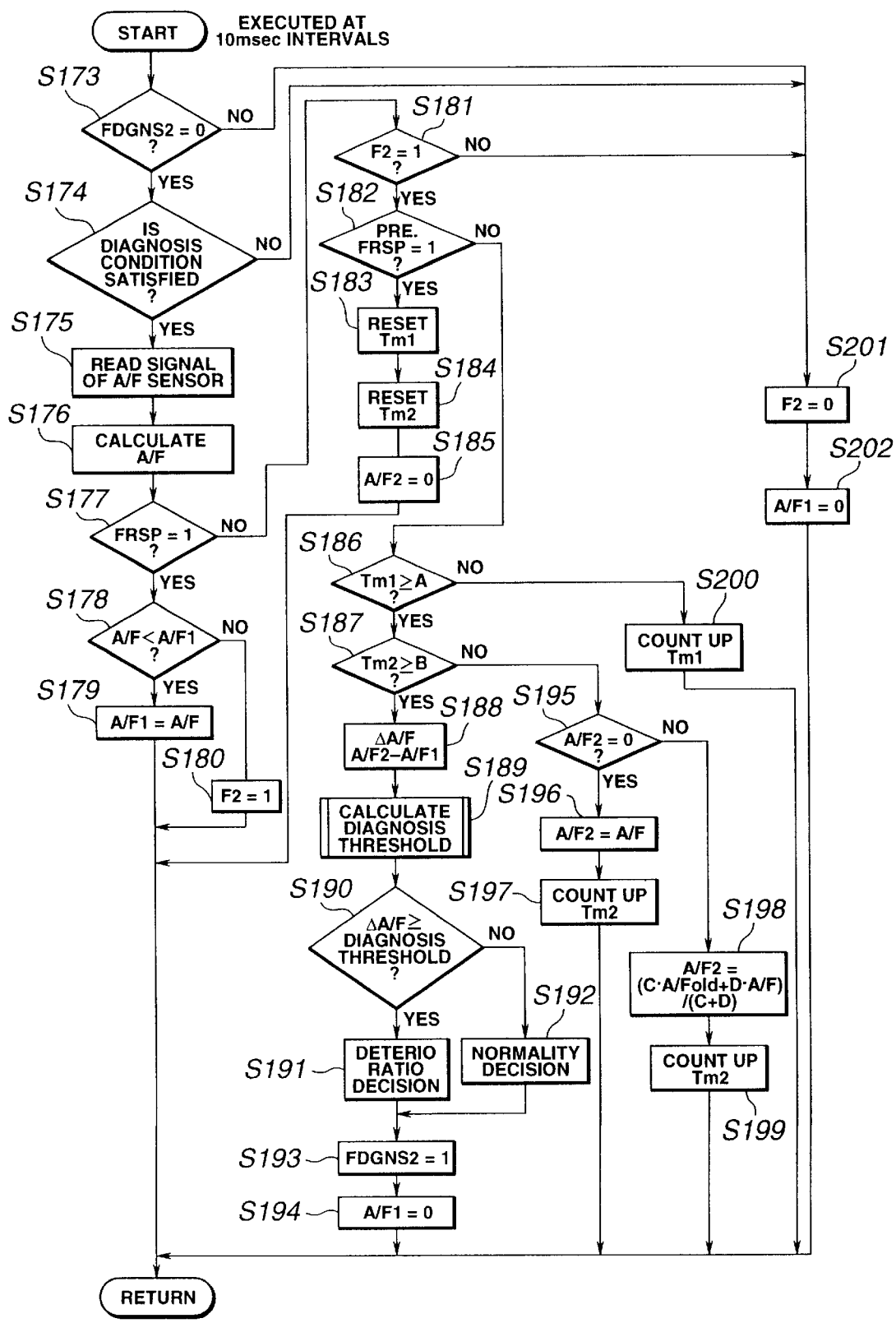
FIG. 20 is a flowchart for diagnosing the deterioration of the catalyst.

FIG. 20 shows a flowchart for diagnosing whether the NOx storage capacity of the NOx storage type three-way catalyst 7, upon detecting the peak difference ΔA/F caused by the second rich-spike treatment. The routine of this flowchart is executed following to the execution of the flowchart of FIG. 18 every 10 msec.

At a step S173, the control unit 11 checks whether the second diagnosis termination flag FDGNS2 is set at 0 or not. When the decision at the step S173 is affirmative, the routine proceeds to a step S174. When the decision at the step S173 is negative, the routine proceeds to a step S201.

At the step S174, the control unit 11 decides whether the diagnosis condition of the NOx storage type three-way catalyst 7 is satisfied or not. More specifically, the control unit 11 decides whether the temperature of the NOx storage type three-way catalyst 7 is greater than a predetermined value. When the decision at the step S174 is affirmative, the routine proceeds to a step S175. When the decision at the step S174 is negative, the routine jumps to the step S201.

At the step S175, the control unit 11 reads the output signal of the A/F sensor 15.

At a step S176 following to the step S175, the control unit 11 calculates the air-fuel ratio A/F of the exhaust gas passed through the NOx storage type three-way catalyst 7.

At a step S177, the control unit 11 decides whether a rich-spike execution flag FRSP is set at 1 or not. When the decision at the step S177 is affirmative (FRSP=1), the routine proceeds to a step S178. During the rich-spike treatment, the control unit 11 detects the peak value A/F1 of the air-fuel ratio by executing steps S177 to S180. When the decision at the step S177 is negative (FRSP≠1), the routine jumps to a step S181.

At the step S178, the control unit 11 decides whether or not the air-fuel ratio A/F at present is smaller than the peak value A/F1 set at the previous routine. When the decision at the step S178 is affirmative (A/F<A/F1), that is, when the present air-fuel ratio A/F is set in a rich side as compared with the prior peak value A/F1 set in the previous routine, the routine proceeds to a step S179. When the decision at the step S178 is negative (A/F≧A/F1), that is, when the present air-fuel ratio A/F is set in a lean side as compared with the prior peak value A/F1 set in the previous routine, the routine jumps to the step S180.

At the step S179 following to the affirmative decision at the step S178, the control unit 11 replaces the previous peak value A/F1 set in the previous routine with the present air-fuel ratio A/F.

At the step S180, the control unit 11 sets a peak flag F2 indicative of the detection of a peak value set at 1 (F2=1).

After the execution of one of the steps S179 and S180, the routine proceeds to a return step.

When the decision at the step S177 is negative, it is decided that the rich-spike treatment is terminated. Therefore, the routine proceeds to the step S181 wherein the control unit 11 checks whether or not the peak value A/F1 has been detected, by checking the flag F2. When the peak value A/F1 is detected (F2=1), the routine proceeds to a step S182. When the peak value A/F1 is not detected (F2=0), the routine jumps to the step S201.

At the step S182, the control unit 11 decides whether the previous rich-spike execution flag FRSP is set at 1 or not. When the decision at the step S182 is affirmative (Pre. FRSP=1), that is, when the rich-spike treatment has just terminated, the routine proceeds to a step S183. When the decision at the step S82 is negative (FRSP≠1), that is, when it is not the moment immediately after the termination of the rich-spike treatment, the routine jumps to a step S186.

At the step S183, the control unit 11 resets the timer Tm1 (Tm1=0).

At a step S184 following to the execution of the step S183, the control unit 11 resets the timer Tm2 (Tm2=0).

At a step S185, the control unit 11 resets the air-fuel ratio A/F2 indicative of the air-fuel ratio detected after the termination of the rich-spike treatment (A/F2=0).

Following to the execution of the step S185, the routine returns to the start step.

When the decision at the step S182 is negative (pre. FRSP≠1), that is, when it is not a moment that the rich-spike treatment has just terminated, the routine jumps to the step S186 wherein the control unit 11 decides whether the content of the timer Tm1 reaches the first predetermined time A or not. The timer Tm1 counts a waiting time for calculating a stabled air-fuel ratio A/F2. Therefore, when the content of the timer Tm1 does not reach the first predetermined time A (Tm1<A), that is, when the decision at the step S186 is negative, the routine jumps to a step S200 wherein the control unit 11 counts up the counter Tm1 (Tm1←Tm1+1). When the content of the timer Tm1 reaches the first predetermined time A (Tm1≧A), that is, when the decision at the step S186 is affirmative, the routine proceeds to a step S187.

At the step S187, the control unit 11 decides whether the content of the timer Tm2 reaches a second predetermined time B or not. The timer Tm2 is prepared for calculating a weighted mean of the air-fuel ratio A/F2 after the rich-spike treatment. More specifically, the weighted mean of the air-fuel ratio A/F2 is calculated until the content of the timer Tm2 reaches the second predetermined time B.

When the decision at the step S187 is negative, that is, when the content of the timer Tm2 does not reach the second predetermined time (Tm2<B), the routine jumps to a step S195 to calculate the weighted mean of the air-fuel ratio A/F2 after the rich-spike treatment. When the decision at the step S187 is affirmative, the routine proceeds to a step S188.

At the step S195 for calculating the weighted mean of the air-fuel ratio A/F2 after the rich-spike treatment, the control unit 11 decides whether the air-fuel ratio A/F2 is 0 or not, to check whether this routine is first. When A/F2=0, representative of a first routine to the step S195, the routine proceeds to a step S196.

At the step S196, the control unit 11 treats the present air-fuel ratio A/F as the air-fuel ratio A/F2 after the rich-spike treatment (A/F2=A/F).

At a step S197, the control unit 11 counts up the timer Tm2 (Tm2←Tm2+1). Following to the step S197, the routine returns to the start step of this flowchart.

At the step S198 following to the negative decision at the step S195 (meaning the second or latter routine to the step S195, the control unit 11 calculates the weighted mean A/F2 from the following equation (2):

$$A/F2 = (C \cdot A/\text{Fold} + D \cdot A/F)/(C+D) \quad (2)$$

wherein C and D are weighted mean coefficient, A/Fold is the air-fuel ratio detected in the prior routine, A/F is the air-fuel ratio detected in the present routine.

Although this embodiment has been arranged to employ the weighted mean to calculate A/F2, it will be understood that the present invention is not limited to this calculation method and may employ other methods.

At a step S199 following to the execution of the step S198, the control unit 11 counts up the timer Tm2 (Tm2←Tm2+1). Following to the execution of the step S199, the routine returns to the start step.

On the other hand, at the step S188 following to the affirmative decision at the step S187, the control unit 11 calculates the peak difference ΔA/F of the A/F sensor 15 from the following equation (3):

$$\Delta A/F = A/F2 - A/F1 \quad (3)$$

Figure 21:
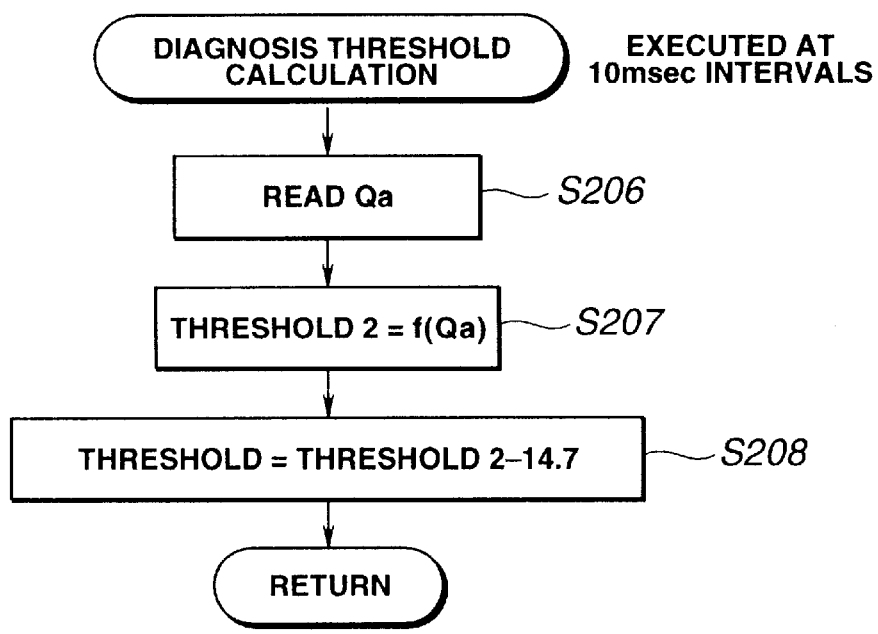
FIG. 21 is a flowchart for calculating the threshold.

At a step S189, the control unit 11 calculates the threshold used for diagnosing the catalyst 7 by jumping the routine to a subroutine shown by a flowchart of FIG. 21.

At a step S190, the control unit 11 decides whether or not the calculated peak difference ΔA/F is greater than or equal to the threshold. When the decision at the step S190 is affirmative (ΔA/F≧diagnosis threshold), the routine proceeds to a step S191 wherein the control unit 11 decides that the NOx storage capacity of the NOx storage type three-way catalyst 7 is deteriorated and informs the deterioration of the catalyst 7 to a driver by turning on the alarm lamp 20. When the decision at the step S190 is negative (ΔA/F< diagnosis threshold), the routine proceeds to a step S192 wherein the control unit 11 decides that the NOx storage capacity of the NOx storage type three-way catalyst 7 is normal.

Following to the execution of the step S191 or S192, the routine proceeds to a step S193 wherein the control unit 11 sets the second diagnosis termination flag FDGNS2 at 1 (FDGNS2=1).

At a step S194 following to the step S193, the control unit 11 resets the peak value A/F1 at 0 (A/F1=0). Then, the routine returns to the start step.

After the execution of the diagnosis routine as mentioned above and the second diagnosis termination flag FDGNS2 is set at 1, the negative decision is made at the step S173 and therefore the routine jumps to the step S201.

At the step S201, the control unit 11 resets the flag F2 (F2=0).

At the step S202 following to the step S202, the control unit 11 resets the peak value A/F1 (A/F1=0). After the execution of the step S202, the routine returns to the start step.

Next, the calculation of the threshold executed at the step S189 of the flowchart shown in FIG. 20 will be discussed with reference to a flowchart of FIG. 21.

At a step S206, the control unit 11 reads the signal outputted from the airflow meter 13 and calculates the intake air quantity Qa.

Figure 22:
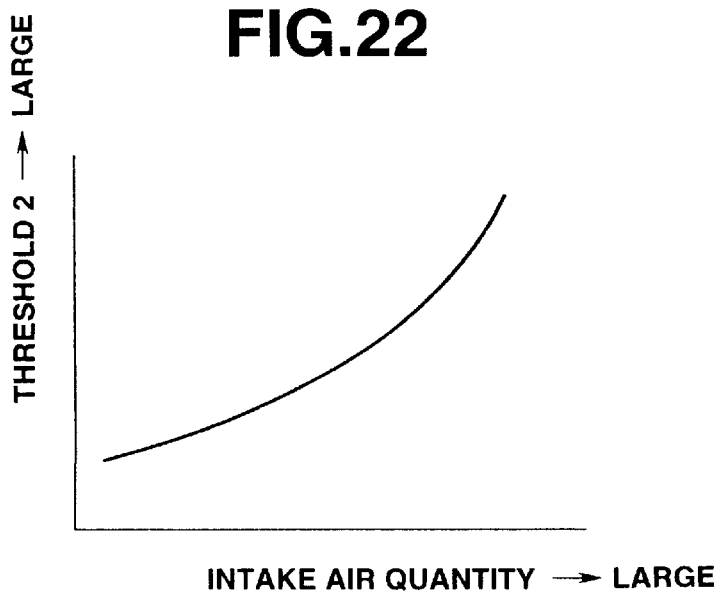
FIG. 22 is a graph showing a characteristic of a threshold 2.

At a step S207, the control unit 11 obtains the threshold 2 from the intake air quantity Qa and a table corresponding to a map indicative of a relationship between the intake air quantity Qa and the threshold 2 as shown in FIG. 22.

At a step S208, the control unit 11 calculates the threshold by subtracting the stoichiometric air-fuel ratio (14.7) from the threshold 2 (Threshold=Threshold 2–14.7).

After the execution of the step S208, the subroutine returns to the step S189 of the main-routine of FIG. 20.

Even during the second rich-spike treatment, if the intake air quantity Qa increases, the amount of HC and CO supplied to the NOx storage type three-way catalyst 7 also increases. This also increases the amount of HC and CO passing through the NOx storage type three-way catalyst 7 without reducing NOx stored in the NOx storage type three-way catalyst 7, and therefore the peak value A/F1 detected by the A/F sensor 15 increases. By largely correcting the threshold 2 on the basis of the table shown in FIG. 22 according to the increase of the intake air quantity Qa, it possible to accurately judge the NOx storage capacity of the NOx storage type three-way catalyst 7 on the basis of the peak value A/F1 detected by the A/F sensor 15 detected during the rich-spike treatment.

Figure 23:
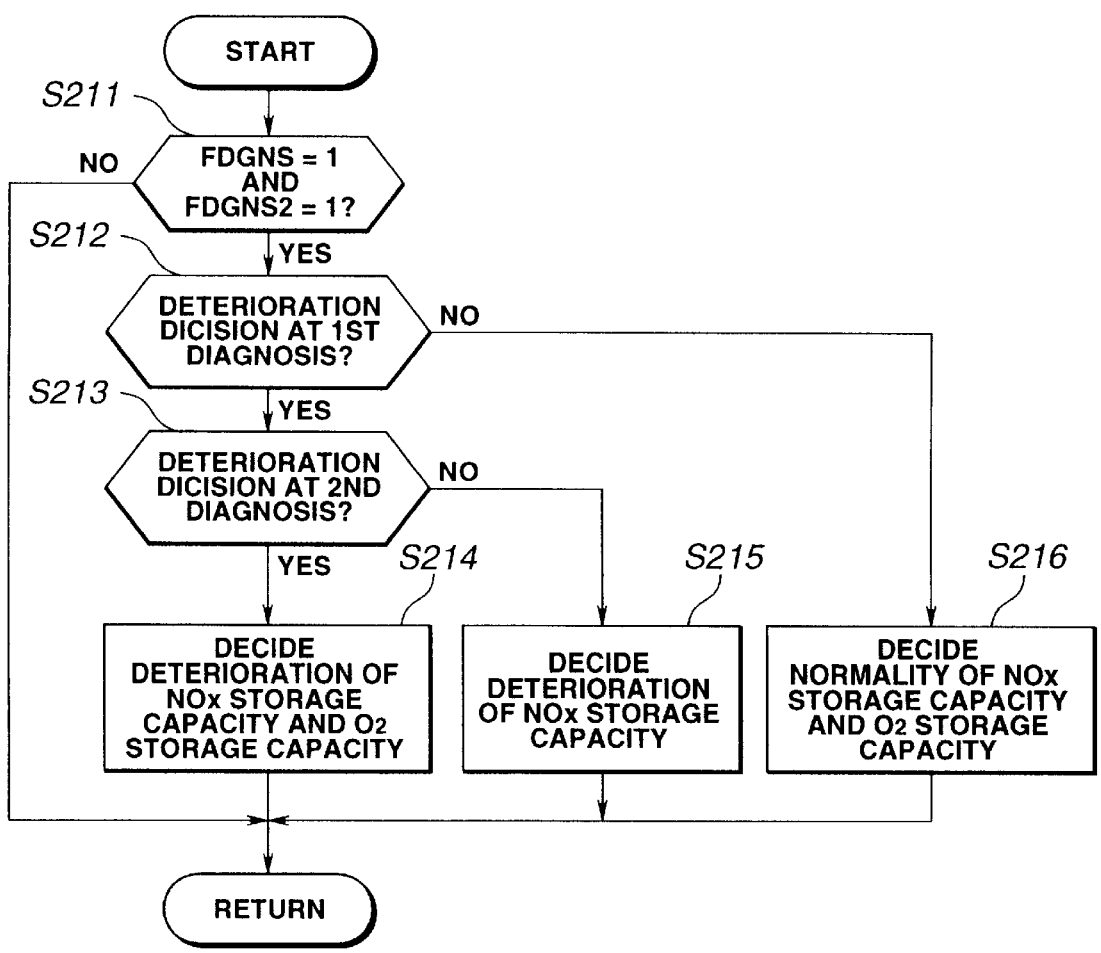
FIG. 23 is a flowchart for diagnosing the deterioration of the catalyst.

FIG. 23 shows a flowchart for deciding the deterioration of the NOx storage capacity and the oxygen storage capacity on the basis of the first diagnosis result obtained by executing the routine of the flowchart shown in FIG. 15 and the second diagnosis result obtained by executing the routine of the flowchart shown in FIG. 20. The routine of the flowchart of FIG. 23 is executed every 10 msec.

At a step S211, the control unit 11 decides whether both of the first diagnosis termination flag FDGN and the second diagnosis termination flag FDGN2 are set at 1 or not. When the decision at the step S211 is affirmative (FDGN=1 and FDGN2=1), the routine proceeds to a step S212. When the decision at the step S211 is negative (FDGN≠1 or FDGN2≠1), the routine jumps to a return step.

At the step S212, the control unit 11 checks whether the result of the first diagnosis is the deterioration decision or not. It is considered from the characteristics shown in FIG. 12 that the NOx storage capacity of the NOx storage type three-way catalyst 7 is deteriorated prior to the deterioration of the oxygen storage capacity of the NOx storage type three-way catalyst 7 and the three-way catalyst 6. Therefore, when the decision at the step S212 is negative, that is, when it is decided in the first diagnosis that the NOx storage capacity is normal, the routine proceeds to a step S216 wherein the control unit 11 diagnoses that both of the NOx storage capacity and the oxygen storage capacity are normal. When the decision at the step S212 is affirmative, the routine proceeds to a step S213.

At the step S213, the control unit 11 checks whether the result of the second diagnosis is the deterioration decision or not. When the decision at the step S213 is negative, that is, when it is decided in the second diagnosis that the NOx storage capacity is normal, the routine proceeds to a step S215 wherein the control unit 11 diagnoses that only the NOx storage capacity is deteriorated. When the decision at the step S213 is affirmative, the routine proceeds to a step S214 wherein the control unit 11 diagnoses that both of the NOx storage capacity and the oxygen storage capacity are deteriorated.

Following to the execution of the step S214, S215 or S216, the routine proceeds to the return step.

Although the embodiments of the present invention have been shown and described to be adapted to an in-cylinder direct fuel injection type internal combustion engine, it will be understood that the present invention may be applied to an internal combustion engine having a structure that a fuel injector is installed in an intake passage.

The entire contents of Japanese Patent Application No. 10-68756 filed on Mar. 18, 1998 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching.

What is claimed is:

1. An exhaust emission control system for an internal combustion engine, comprising:

a nitrogen oxide storage type three-way catalyst disposed in an exhaust passage of the engine, said catalyst functioning to store nitrogen oxide of exhaust gases when an air-fuel ratio of air-fuel mixture supplied to the engine is leaner than a stoichiometric ratio and to release and reduce nitrogen oxide when the air-fuel ratio of the air-fuel mixture is richer than or equal to the stoichiometric ratio;

an air-fuel sensor disposed downstream of said nitrogen oxide storage type three-way catalyst in the exhaust passage;

a fuel injector injecting fuel to the engine according to an injection signal; and a control unit arranged
to calculate a quantity of fuel to bring the air fuel ratio of the air-fuel mixture close to a target ratio and to output the injection signal to said fuel injector based on the calculated quantity of fuel,
to execute a first rich-spike treatment of temporally enriching the air-fuel ratio of the air-fuel mixture by adjusting the injection signal
to execute a second rich spike treatment of temporally enriching the air-fuel ratio of the air-fuel mixture by adjusting the infection signal sequentially following the first rich-spike treatment, and
to diagnose a nitrogen oxide storage capacity and an oxygen storage capacity of said nitrogen oxide storage type three-way catalyst on the basis of peak values of the detected air-fuel ratio during the first rich-spike treatment and second rich-spike treatment.

2. An exhaust emission control system for an internal combustion engine, comprising:

a nitrogen oxide storage type three-way catalyst disposed in an exhaust passage of the engine, said catalyst functioning to store nitrogen oxide of exhaust gases when an air-fuel ratio of air-fuel mixture supplied to the engine is leaner than a stoichiometric ratio and to release nitrogen oxide when the air-fuel ratio of the air-fuel mixture is richer than or equal to the stoichiometric ratio;

air-fuel ratio controlling means for temporally enriching the air-fuel ratio of the air-fuel mixture so as to promote releasing and reducing of nitrogen oxide;

air-fuel ratio detecting means for detecting an air-fuel ratio of exhaust gases passed through said nitrogen oxide storage type three-way catalyst;

airflow detecting means for detecting a quantity of intake air to the engine; and catalyst capacity diagnosing means for diagnosing a nitrogen oxide storage capacity of said nitrogen oxide storage type three-way catalyst on the basis of a peak value of the air-fuel ratio detected by said air fuel ratio detecting means during the enriching operation executed by said air-fuel ratio controlling means and a threshold which is in accordance with an intake air quantity detected by said airflow detecting means.

3. An exhaust emission control system as claimed in claim 1, further comprising an airflow meter which detects a quantity of intake air to the engine, wherein said control unit is arranged to diagnose the nitrogen oxide storage capacity of said nitrogen oxide storage type three-way catalyst on the basis of the quantity of the intake air detected by the airflow meter and the peak value detected during the first rich-spike treatment.

4. An exhaust emission control system as claimed in claim 1, wherein said control unit is arranged to calculate a difference between the peak value detected during the first rich-spike treatment and a stable air-fuel ratio which is detected when the air-fuel ratio is stable after the first rich-spike treatment, to calculate a threshold by subtracting a stoichiometric ratio from a sum of the stable air-fuel ratio and a first threshold, and to diagnose that the nitrogen oxide storage capacity of said nitrogen oxide storage type three-way catalyst is deteriorated when the difference is greater than the threshold.

5. An exhaust emission control system as claimed in claim 1, wherein said control unit is arranged to calculate a peak difference $\Delta A/F$ and a threshold PH by using two equations $\Delta A/F = A/F2 - A/F1$ and $TH = TH1 + A/F2 - (\text{stoichiometric ratio})$ where A/F2 is an air-fuel ratio detected when the air-fuel ratio of the exhaust gases is stable after the first rich-spike treatment, A/F1 is the peak value of the air-fuel ratio detected during the first rich-spike treatment, and TH1 is a preset first threshold, said control unit being arranged to diagnose that the nitrogen oxide storage capacity of said nitrogen oxide storage type three-way catalyst is deteriorated when the peak difference $\Delta A/F$ is greater than the threshold TH.

6. An exhaust emission control system as claimed in claim 4, wherein said control unit is arranged to increase the first threshold according to an increase of the intake air quantity of the engine.

7. An exhaust emission control system as claimed in claim 4, wherein said control unit is arranged to diagnose that the nitrogen oxide storage capacity and oxygen storage capacity of said nitrogen oxide storage type three-way catalyst are normal when the peak difference is smaller than the threshold.

8. An exhaust emission control system as claimed in claim 1, wherein said control unit decides that both the nitrogen oxide storage capacity and the oxygen storage capacity of said nitrogen oxide storage type three-way catalyst are normal when said control unit determines in a first rich-spike treatment diagnosis that the nitrogen oxide capacity is normal.

9. An exhaust emission control system as claimed in claim 1, wherein said control unit is arranged to calculate a difference between the peak value detected during the second rich-spike treatment and a stable air-fuel ratio which is detected when the air-fuel ratio is stable after the second rich-spike treatment, to calculate a threshold by subtracting a stoichiometric ratio from a second threshold, and to diagnose that the oxygen storage capacity of said nitrogen oxide storage type three-way catalyst is deteriorated when the difference is greater than the threshold.

10. An exhaust emission control system as claimed in claim 1, wherein said control unit is arranged to calculate a peak difference $\Delta A/F$ and a threshold TH by using two equations $\Delta A/F = A/F2 - A/F1$ and $TH = TH2 - (\text{stoichiometric ratio})$, where A/F1 is the peak value of the air-fuel ratio detected during the second rich-spike treatment, A/F2 is an air-fuel ratio detected when the air-fuel ratio of the exhaust gases is stable after the second rich-spike treatment, and TH2 is a preset second threshold, said control unit being arranged to diagnose that the oxygen storage capacity of said nitrogen oxide storage type three-way catalyst is deteriorated when the peak difference $\Delta A/F$ is greater than the threshold TH.

11. An exhaust emission control system as claimed in claim 10, wherein said control unit is arranged to increase the second threshold according to an increase of the intake air quantity of the engine.

12. An exhaust emission control system as claimed in claim 1, further comprising an alarm lamp which is turned on when said control unit diagnoses that the nitrogen oxide storage capacity of said nitrogen oxide storage type three-way catalyst is deteriorated.

13. An exhaust emission control system as claimed in claim 5, where in s aid control unit calculates A/F2 from the following equation (2):

$$A/F2 = (C \cdot A/Fold + D \cdot A/F)/(C+D) \qquad (2)$$

wherein C and D are weighted mean coefficient, A/Fold is the air-fuel ratio detected in the prior routine, A/F is the air-fuel ratio detected in the present routine.

14. An exhaust emission control system as claimed in claim 1, wherein said control unit diagnoses that the nitrogen oxide storage capacity of said nitrogen oxide storage type three-way catalyst is deteriorated when a difference between a stoichiometric ratio and the peak value detected during the first rich-spike treatment is greater than a threshold.

15. An exhaust emission control system as claimed in claim 1, wherein said control unit decides that only the nitrogen oxide storage capacity is deteriorated when said control unit decides in a first rich-spike treatment diagnosis that the nitrogen oxide capacity is deteriorated and decides in a second rich-spike treatment diagnosis that the nitrogen oxide storage capacity is normal.

16. An exhaust emission control system as claimed in claim 1, wherein said control unit decides that both the nitrogen oxide storage capacity and the oxygen storage capacity are deteriorated when said control unit decides in both a first rich-spike treatment diagnosis and a second rich-spike treatment diagnosis that the nitrogen oxide capacity is deteriorated.

* * * * *